United States Patent
Eyring et al.

(10) Patent No.: US 9,638,331 B2
(45) Date of Patent: May 2, 2017

(54) FLUID CONTROL ASSEMBLIES AND FLOW PATH INSERTS

(71) Applicant: Western Enterprises / Scott Fetzer Company, Westlake, OH (US)

(72) Inventors: Bryan D. Eyring, Lakewood, OH (US); Gregory B. Eytchison, Huron, OH (US); Ryan M. Pereira, Westlake, OH (US); William C. Wido, Avon, OH (US)

(73) Assignee: Western Enterprises/Scott Fetzer Company, Westlake, OH (US)

( * ) Notice: Subject to any disclaimer, the term of this patent is extended or adjusted under 35 U.S.C. 154(b) by 441 days.

(21) Appl. No.: 13/946,561

(22) Filed: Jul. 19, 2013

(65) Prior Publication Data

US 2015/0020899 A1    Jan. 22, 2015

(51) Int. Cl.
*F16K 1/04* (2006.01)
*G05D 16/10* (2006.01)
(Continued)

(52) U.S. Cl.
CPC ............... *F16K 1/04* (2013.01); *F16K 15/18* (2013.01); *F16K 27/00* (2013.01); *F16K 31/60* (2013.01);
(Continued)

(58) Field of Classification Search
CPC . F16K 1/04; F16K 15/18; F16K 27/00; F16K 31/60; G05D 16/103; Y10T 137/794; Y10T 137/87917; A62B 9/022

USPC .......... 137/614.19, 901, 636, 636.4, 599.01, 137/625.42, 599.09, 636.3; 251/205, 206, 251/208
See application file for complete search history.

(56) References Cited

U.S. PATENT DOCUMENTS 4,064,890 A    12/1977 Collins et al.
4,489,751 A    12/1984 Acomb et al.
(Continued)

OTHER PUBLICATIONS

Cavagna Group; "Valve With Integrated Pressure Regulator for Medical Oxygen"; Nov. 2012; 4 pages.
(Continued)

*Primary Examiner* — Craig Schneider
*Assistant Examiner* — Josephine Trinidad-Borges
(74) *Attorney, Agent, or Firm* — Ulmer & Berne LLP

(57) ABSTRACT

A flow path insert for a fluid control assembly includes an upstream portion and a downstream portion integral with the upstream portion. The upstream portion includes an upstream peripheral surface and the downstream portion includes a downstream peripheral surface. The upstream portion and the downstream portion cooperate to define an inlet passage and an outlet passage in fluid communication with the inlet passage. The inlet passage defines a first axis and the outlet passage defines a second axis that is transverse to the first axis. When the flow path insert is positioned within a body of a fluid control assembly, the upstream peripheral surface is in contacting engagement with the body and the downstream peripheral surface is spaced from the body. At least the downstream portion of the flow path insert and the body cooperate to define an annular passage in fluid communication with the outlet passage. Fluid control assemblies are also disclosed.

22 Claims, 30 Drawing Sheets

(51) Int. Cl.
*F16K 15/18* (2006.01)
*F16K 31/60* (2006.01)
*F16K 27/00* (2006.01)

(52) U.S. Cl.
CPC ........ *G05D 16/103* (2013.01); *Y10T 137/794* (2015.04); *Y10T 137/87917* (2015.04)

(56) References Cited

U.S. PATENT DOCUMENTS

| | | | | |
|---|---|---|---|---|
| 4,909,476 | A | * | 3/1990 | Messick ............... G01F 1/42 251/205 |
| 5,020,774 | A | * | 6/1991 | Christianson ........... F16K 3/32 251/129.15 |
| 5,127,436 | A | * | 7/1992 | Campion ............... F17C 13/04 137/614.11 |
| 5,246,201 | A | * | 9/1993 | Messick ............... G01F 1/42 251/205 |
| D367,921 | S | | 3/1996 | Lewellen |
| 5,566,713 | A | * | 10/1996 | Lhomer ............... F16K 1/305 137/505.25 |
| 5,865,174 | A | | 2/1999 | Kloeppel |
| 6,053,056 | A | | 4/2000 | Zaiser et al. |
| 6,568,437 | B2 | * | 5/2003 | Dean ............... F16K 17/285 137/505.11 |
| 6,612,307 | B2 | * | 9/2003 | Byrd ............... A61M 16/20 128/204.22 |
| 6,647,982 | B1 | * | 11/2003 | Zaiser ............... A61M 16/10 128/204.18 |
| 6,782,918 | B2 | * | 8/2004 | Rousselin ............ F16K 1/305 137/613 |
| 6,986,350 | B2 | | 1/2006 | Zaiser et al. |
| 7,073,490 | B2 | * | 7/2006 | Ricco ............... F02M 21/0239 123/527 |
| 7,237,570 | B2 | | 7/2007 | Garnard et al. |
| 7,490,811 | B2 | | 2/2009 | Nicolini |
| 7,823,606 | B2 | | 11/2010 | Nicolini |
| 8,146,592 | B2 | * | 4/2012 | Voege ............... A61M 16/0666 128/200.24 |
| 2004/0262431 | A1 | * | 12/2004 | Shimizu ............... F02B 23/104 239/533.12 |
| 2005/0194050 | A1 | * | 9/2005 | Pietrantoni ............ A62B 9/022 137/613 |
| 2006/0060251 | A1 | * | 3/2006 | Gamard ............... F16K 1/305 137/613 |
| 2007/0062585 | A1 | * | 3/2007 | Gamard ............... F16K 1/305 137/613 |

OTHER PUBLICATIONS

Western Enterprises; "High-Performance Packaging for High-Performance Products"; known to have been in the public domain prior to Jul. 19, 2012; 2 pages.
Western Enterprises; "HVAC Nitrogen Purging Hybrid Regulator"; available at <http://westernenterprises.com/wp-content/uploads/2013/09/Western-Enterprises-VN-Series-2012.pdf.; known to have been in the public domain prior to Jul. 19, 2012; 2 pages.
Western Enterprises; "Innovator Gas Manifold Systems"; available at <http://westernenterprises.com/wp-content/uploads/2013/09/Western-Innovator-2013.pdf>; known to have been in the public domain prior to Jul. 19, 2012; 52 pages.
Western Enterprises; "The New VN Series, Nitrogen Purging / Testing Regulator for HVAC"; known to have been in the public domain prior to Jul. 19, 2012; 20 pages.
Western Enterprises; "Company Profile"; retrieved from <http://westernenterprises.com/companyprofile/index.html> on Jan. 23, 2013; known to have been in the public domain prior to Jul. 19, 2012; 1 page.
Western Enterprises; "Welcome to WesternEnterprises.com"; retrieved from <http://westernenterprises.com/new-main.html> on Jan. 23, 2013; known to have been in the public domain prior to Jul. 19, 2012; 1 page.
Western Enterprises; "News"; retrieved from <http://westernenterprises.com/news.index.htm> on Jan. 23, 2013; known to have been in the public domain prior to Jul. 19, 2012; 2 pages.
Western Medica; "Medical Gas Equipment"; 2000; 4 pages.
Western; Product Data Sheet OPA-530 Regulator; Mar. 2001; 2 pages.
Western; Product Data Sheet OPX-5X0 Regulator; Mar. 2007; 2 pages.

* cited by examiner

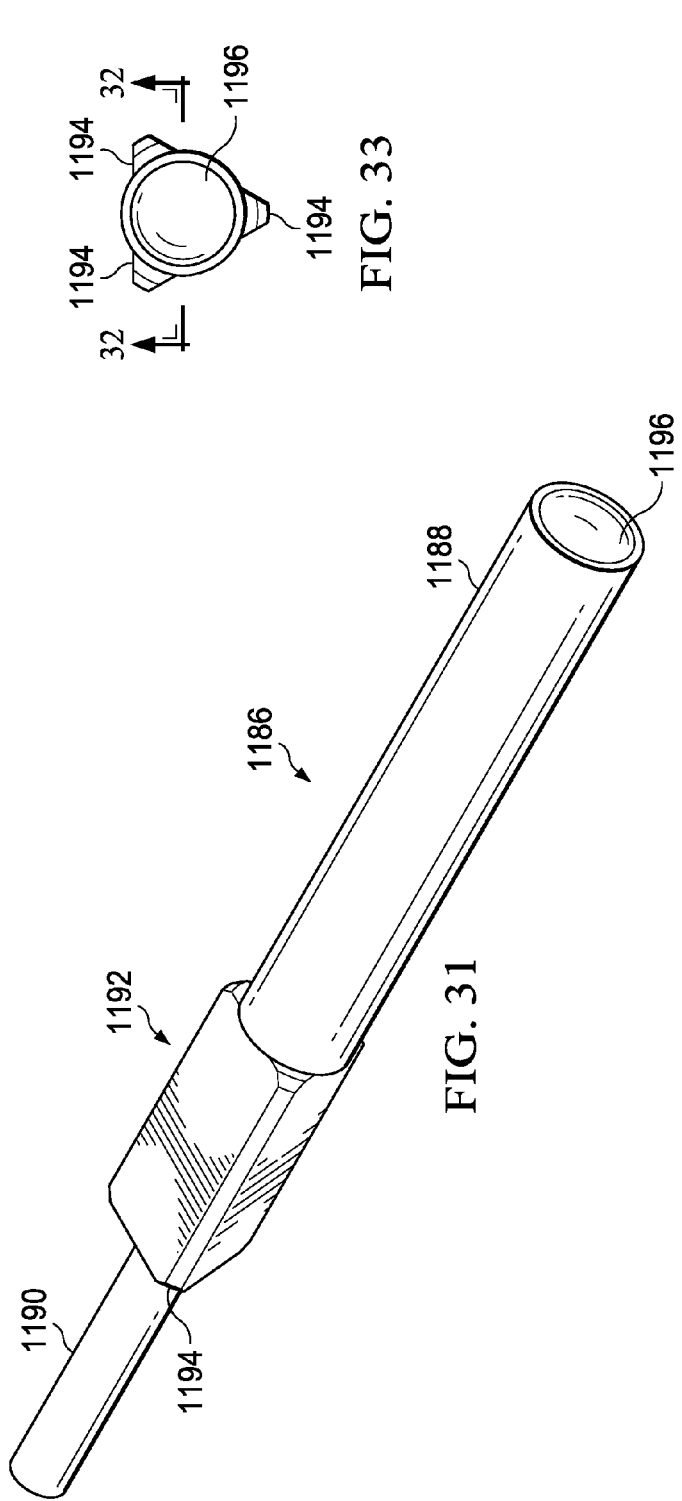
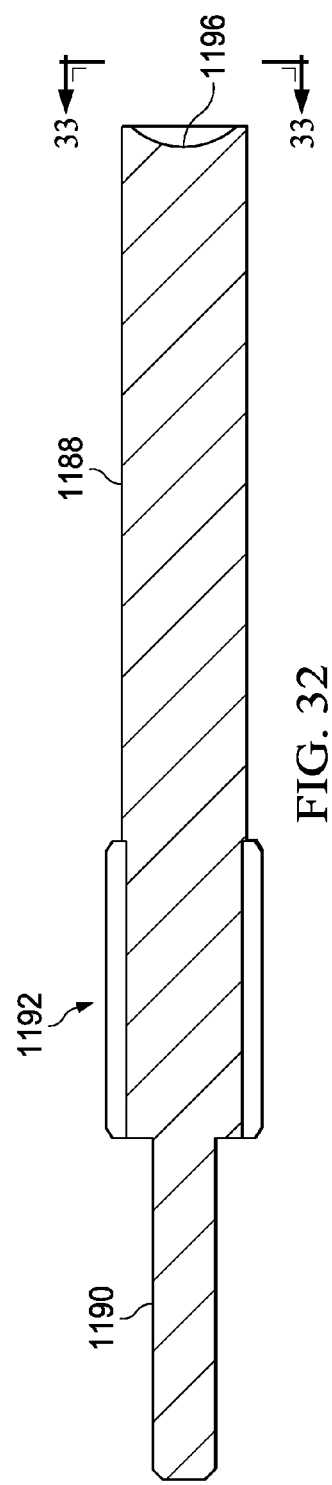
FIG. 31
FIG. 33
FIG. 32

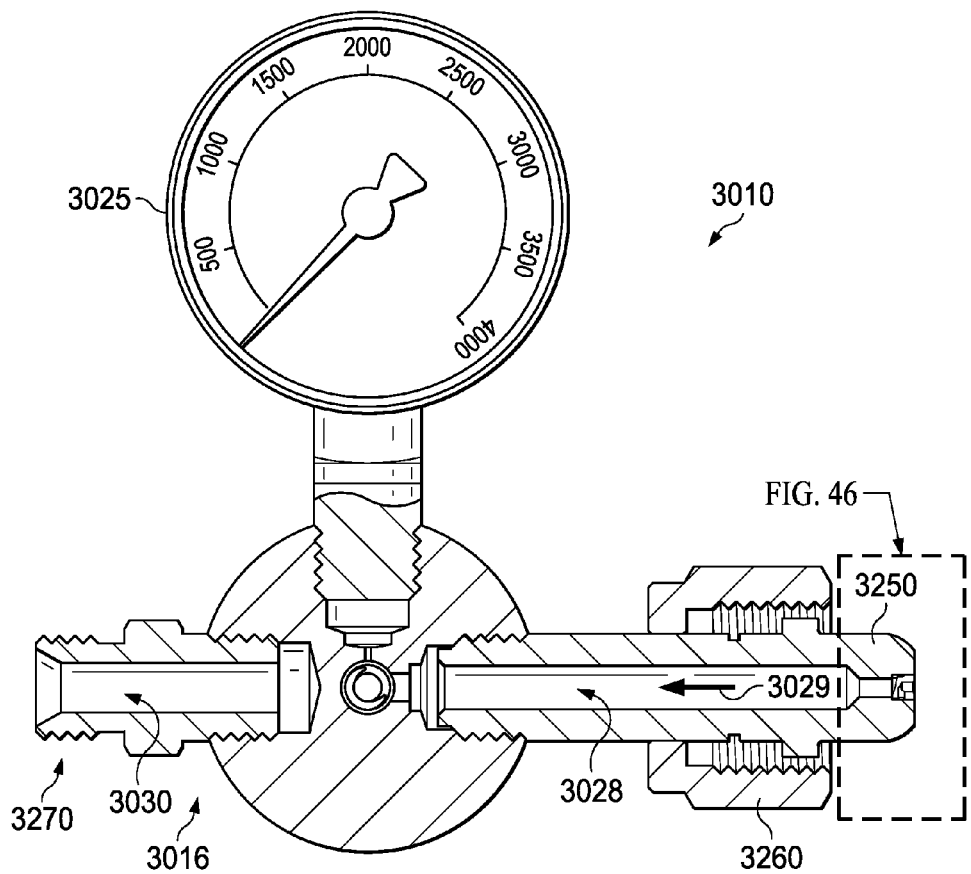
FIG. 45
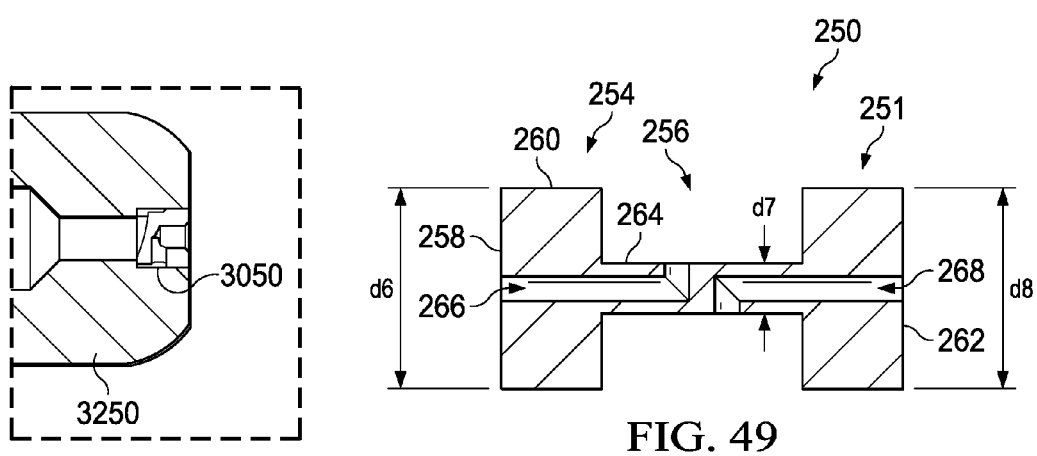
FIG. 46
FIG. 49

FLUID CONTROL ASSEMBLIES AND FLOW PATH INSERTS

TECHNICAL FIELD

The present disclosure relates to flow path inserts, and associated fluid control assemblies, used to regulate the pressure and flow rate of a pressurized fluid.

BACKGROUND

Systems are known that regulate the pressure and flow rate of a high pressure gas, such as oxygen, which is supplied from a tank or other container, for various applications. Some known systems, which include a pressure regulator, have experienced oxidizer-related, auto-ignition events. Known pressure regulators used in these systems typically include elastomers and/or polymers for consistent and leak-free operation.

In the event of an ignition, these materials of the pressure regulators can ignite, yielding a kindling chain that adds further energy to the initial ignition event. Known devices that have been used to address this issue include orifices and surge pressure valves. Both of these components are highly restrictive, with regard to flow rate, and require additional components and special geometries to facilitate.

SUMMARY

According to one embodiment, a flow path insert for a fluid control assembly includes an upstream portion and a downstream portion integral with the upstream portion. The upstream portion includes an upstream end surface and an upstream peripheral surface. The downstream portion includes a downstream end surface and a downstream peripheral surface. The upstream peripheral surface has a first diameter and the downstream peripheral surface has a second diameter. The first diameter is greater than the second diameter. The upstream portion and the downstream portion cooperate to define an inlet passage and an outlet passage in fluid communication with the inlet passage. The outlet passage extends through the downstream peripheral surface. The inlet passage defines a first axis and the outlet passage defines a second axis. The second axis is transverse to the first axis. When the flow path insert is positioned within a body of a fluid control assembly, the upstream peripheral surface is in contacting engagement with the body and the downstream peripheral surface is spaced from the body. At least the downstream portion of the flow path insert and the body cooperate to define an annular passage in fluid communication with the outlet passage.

According to another embodiment, a fluid control assembly includes a body, a pressure regulator coupled with the body, and a flow path insert positioned within, and engaged with, the body. The body defines a fluid inlet passage, a fluid outlet passage, and a valve inlet orifice. The pressure regulator at least partially defines a regulator chamber and operably regulates a pressure of a fluid flowing through the body from the fluid inlet passage to the fluid outlet passage. The flow path insert includes an ignition-resistant material and defines an inlet passage and an outlet passage in fluid communication with the inlet passage. The inlet passage defines a first axis, and the outlet passage defines a second axis transverse to the first axis. The inlet passage defined by the flow path insert is in at least selective fluid communication with the fluid inlet passage. The flow path insert cooperates with at least the body to define an annular passage in fluid communication with the outlet passage defined by the flow path insert, and with the valve inlet orifice. The regulator inlet orifice is in at least intermittent fluid communication with the regulator chamber.

According to yet another embodiment, a fluid control assembly includes a body and a pressure regulator coupled with the body. The body defines a fluid inlet passage, a fluid outlet passage, and a valve inlet orifice. The fluid control assembly also includes a plurality of flow path inserts, with each of the flow path inserts being positioned within, and engaged with, the body. The pressure regulator at least partially defines a regulator chamber, and is downstream of the fluid inlet passage and upstream of the fluid outlet passage. For each of the flow path inserts, the flow path insert includes an ignition-resistant material and defines an inlet passage and an outlet passage in fluid communication with the inlet passage. Also, for each of the flow path inserts, the inlet passage defines a first axis, the outlet passage defines a second axis transverse to the first axis, and the flow path insert cooperates with at least the body to define an annular passage in fluid communication with the outlet passage.

According to yet another embodiment, a fluid control assembly includes a body, which defines a fluid inlet passage, a fluid outlet passage, and a valve inlet orifice. The fluid control assembly also includes a pressure regulator coupled with the body and a multi-function valve coupled with the body. The pressure regulator at least partially defines a regulator chamber that is in at least intermittent fluid communication with the valve inlet orifice. The multi-function valve includes a knob that is rotatable relative to the body, and an orifice plate coupled with the knob. The orifice plate defines a plurality of circumferentially spaced orifices. The multi-function valve also includes a valve seat and a valve structure that is translatable relative to the valve seat between a closed position and an open position. The multi-function valve further includes a biasing member that biases the valve structure toward the closed position. The valve structure is translatable between the closed position and the open position in response to rotation of the knob, such that the fluid inlet passage is in selective fluid communication with the valve inlet orifice. The orifice plate is rotatable with the knob, such that each of the orifices is in selective fluid communication with each of the regulator chamber and the fluid outlet passage, in response to rotation of the knob.

According to yet another embodiment, a flow path insert for a fluid control assembly includes a first portion and a second portion integral with the first portion. The first portion includes a first peripheral surface and the second portion includes a second peripheral surface. The first peripheral surface has a first diameter and the second peripheral surface has a second diameter. The first diameter is greater than the second diameter. The first portion and the second portion cooperate to define a first passage and a second passage in fluid communication with the first passage. The second passage extends through the second peripheral surface. The first passage defines a first axis and the second passage defines a second axis that is transverse to the first axis. When the flow path insert is positioned within a body of a fluid control assembly, the first peripheral surface is in contacting engagement with the body and the second peripheral surface is spaced from the body, and at least the second portion of the flow path insert and the body cooperate to define an annular passage in fluid communication with the second passage.

According to yet another embodiment, a flow path insert for a fluid control assembly includes a first portion and a second portion integral with the first portion. The first portion includes a first end surface and a first peripheral surface and the second portion includes a second end surface and a second peripheral surface. The first peripheral surface has a first diameter and the second peripheral surface has a second diameter. The first diameter is greater than the second diameter. The first portion and the second portion cooperate to define a first passage and a second passage in fluid communication with the first passage. The first passage extends through each of the first end surface and the second peripheral surface. The second passage extends through the second peripheral surface and the second end surface. When the flow path insert is positioned within a body of a fluid control assembly, the first peripheral surface is in contacting engagement with the body and the second peripheral surface is spaced from the body, such that the first portion of the flow path insert, the second portion of the flow path insert, and the body cooperate to define an annular passage in fluid communication with each of the first passage and the second passage.

BRIEF DESCRIPTION OF THE DRAWINGS

It is believed that certain embodiments will be better understood from the following description taken in conjunction with the accompanying drawings in which:

FIG. 31 is a perspective view of a valve stem of a multi-function valve of the fluid control assembly of FIG. 19;

FIG. 32 is a cross-sectional view taken along line 32-32 in FIG. 33;

FIG. 33 is a proximal end elevational view of the valve stem of FIG. 31;

FIG. 45 is a cross-sectional view depicting a portion of the fluid control assembly of FIG. 44, with a remaining portion of the fluid control assembly being depicted in elevation;

FIG. 46 is an enlarged view of an encircled portion of FIG. 45;

FIG. 49 is a cross-sectional view depicting a flow path insert according to another embodiment.

DETAILED DESCRIPTION

Figure 1:
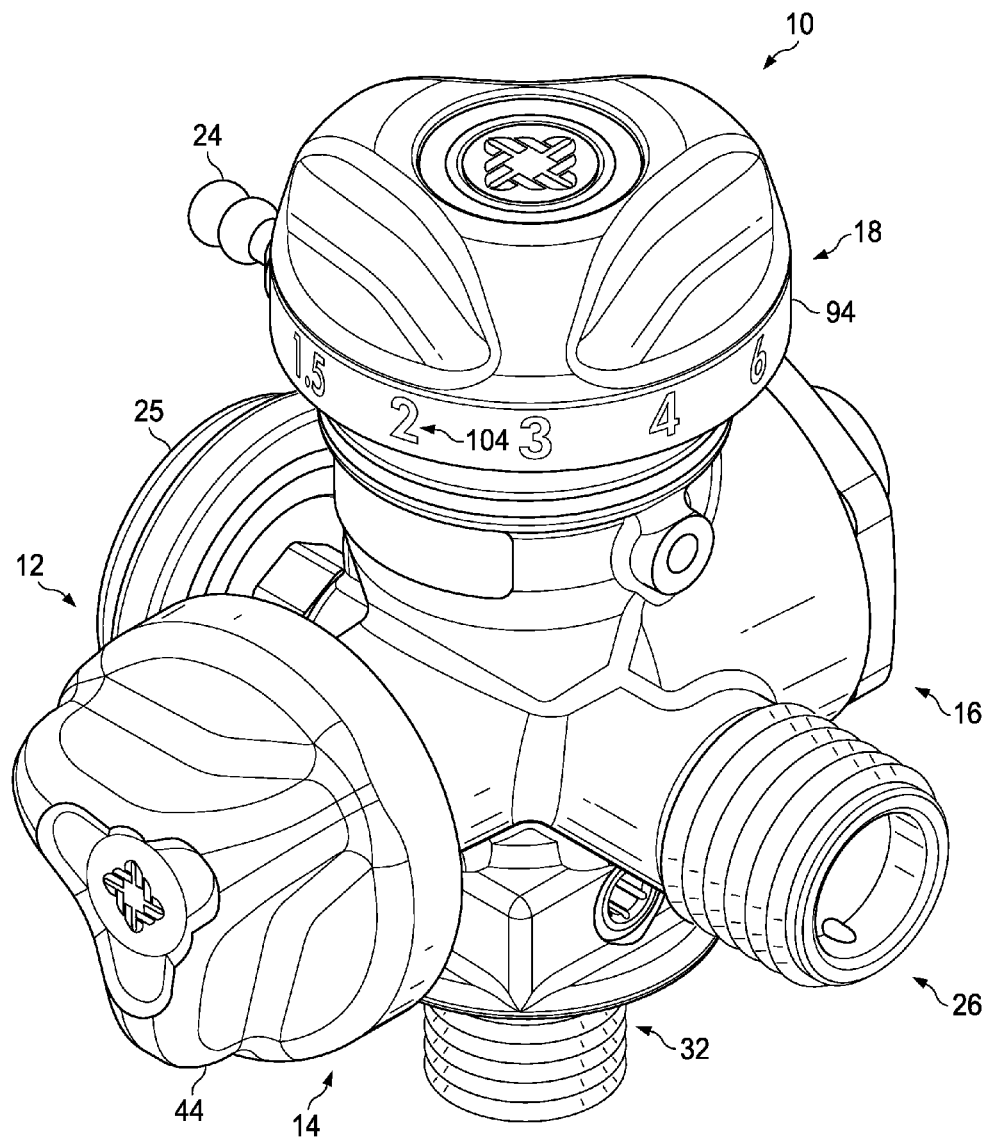
FIG. 1 is a perspective view of a fluid control assembly according to one embodiment.
Figure 2:
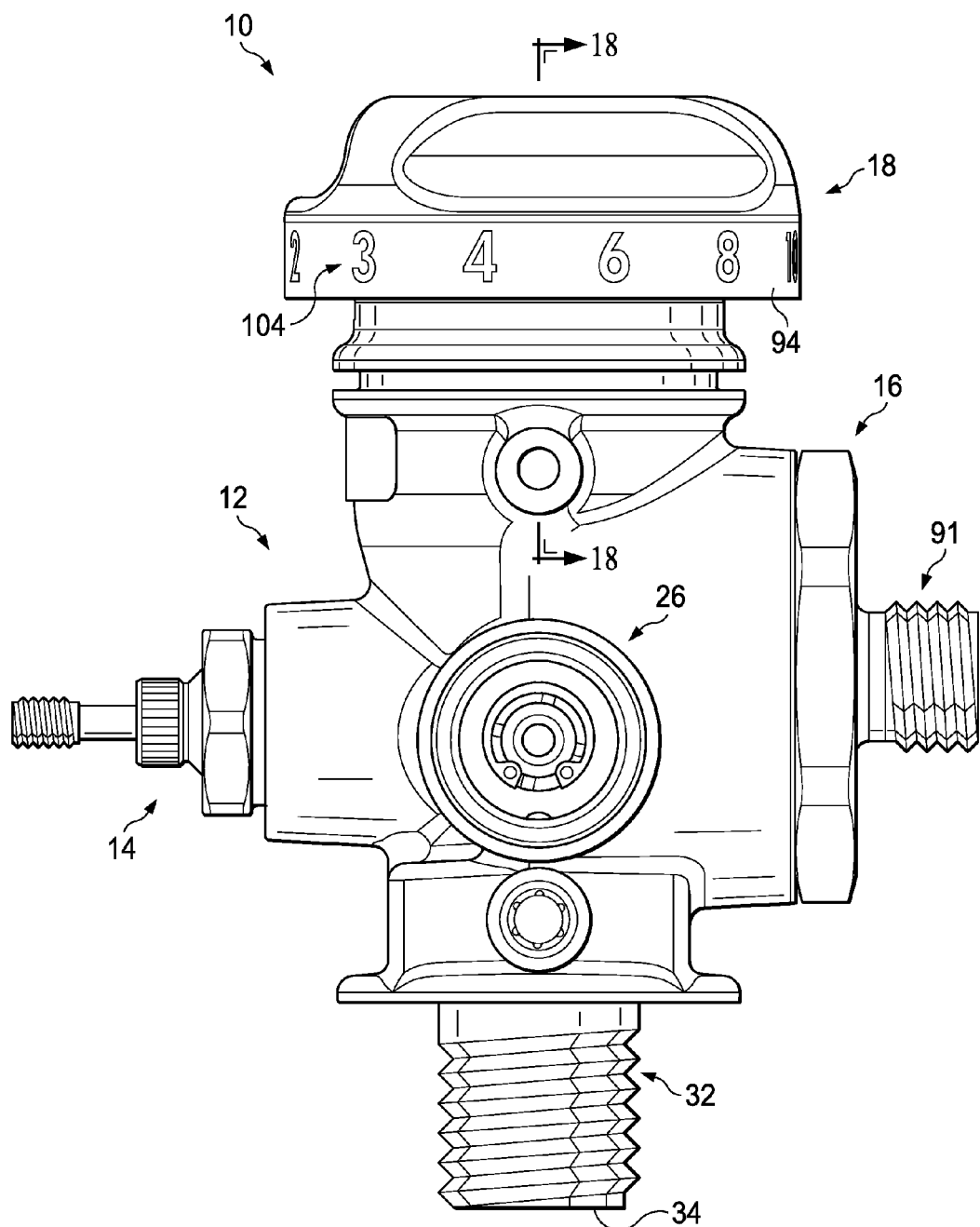
FIG. 2 is a left side elevational view of the fluid control assembly of FIG. 1.
Figure 3:
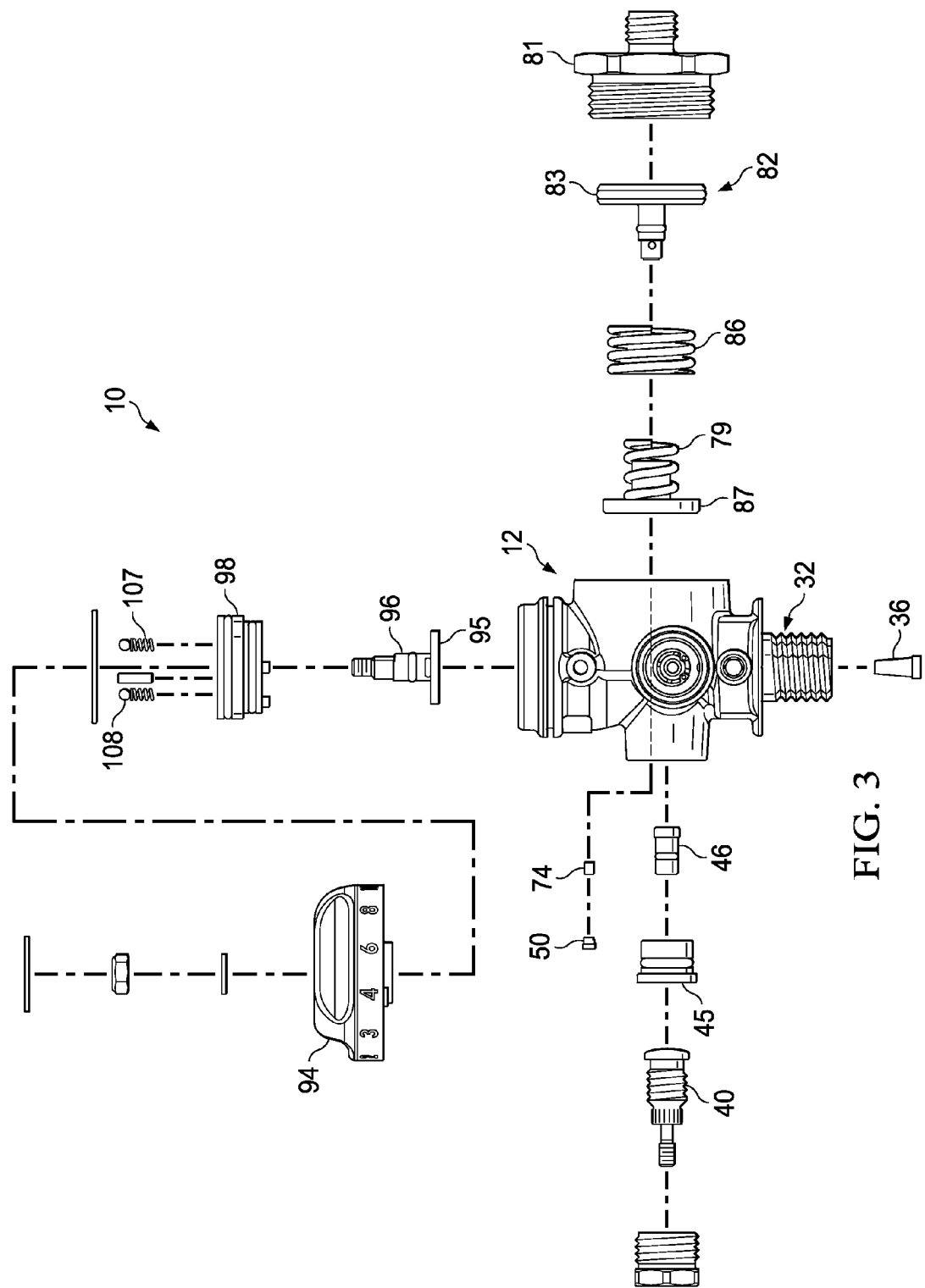
FIG. 3 is an exploded perspective view of the fluid control assembly of FIG. 1, with the fluid control assembly oriented as shown in FIG. 2.

Certain embodiments are described herein in conjunction with the views and examples of FIGS. 1-49, wherein like numbers indicate the same or corresponding elements throughout the views. FIGS. 1-18 illustrate a fluid control assembly 10, according to one embodiment. The fluid control assembly 10 can be used as a part of a fluid delivery system. For example, in one embodiment, the fluid control assembly 10 can be included in a system for delivering a gas, such as oxygen, to a patient. The fluid control assembly 10 can be configured to regulate a pressure of a fluid, for example, gaseous oxygen, which is supplied from a source of pressurized fluid (not shown), such as an oxygen tank. The fluid control assembly 10 can also discharge the regulated, pressurized fluid, such as oxygen, at varying flow rates. The fluid control assembly 10 can be relatively compact, such that it can be portable. The fluid control assembly 10 can be used in conjunction with a source of pressurized gas, such as oxygen, that can also be portable, which can facilitate using the associated fluid delivery system in either a private home or a healthcare facility, such as a hospital. Also, the fluid control assembly 10 can be used in any other suitable application, for example, with industrial gas regulators, or any other assembly utilizing a regulator for the delivery of a gas.

In one embodiment, the fluid control assembly 10 can include a body 12, an isolation valve 14, a pressure regulator 16 and a control valve 18. Each of the isolation valve 14, the pressure regulator 16 and the control valve 18 can be coupled with the body 12. The body 12 can define a first cavity 20 (FIG. 6) and a second cavity 22 (FIG. 7). A portion of the isolation valve 14 can be positioned within the first cavity 20, and at least a portion of the pressure regulator 16 can be positioned within the second cavity 22. The isolation valve 14 and the pressure regulator 16 can each be threadedly engaged with the body 12. The control valve 18 can be rotatably coupled with the body 12.

Figure 4:
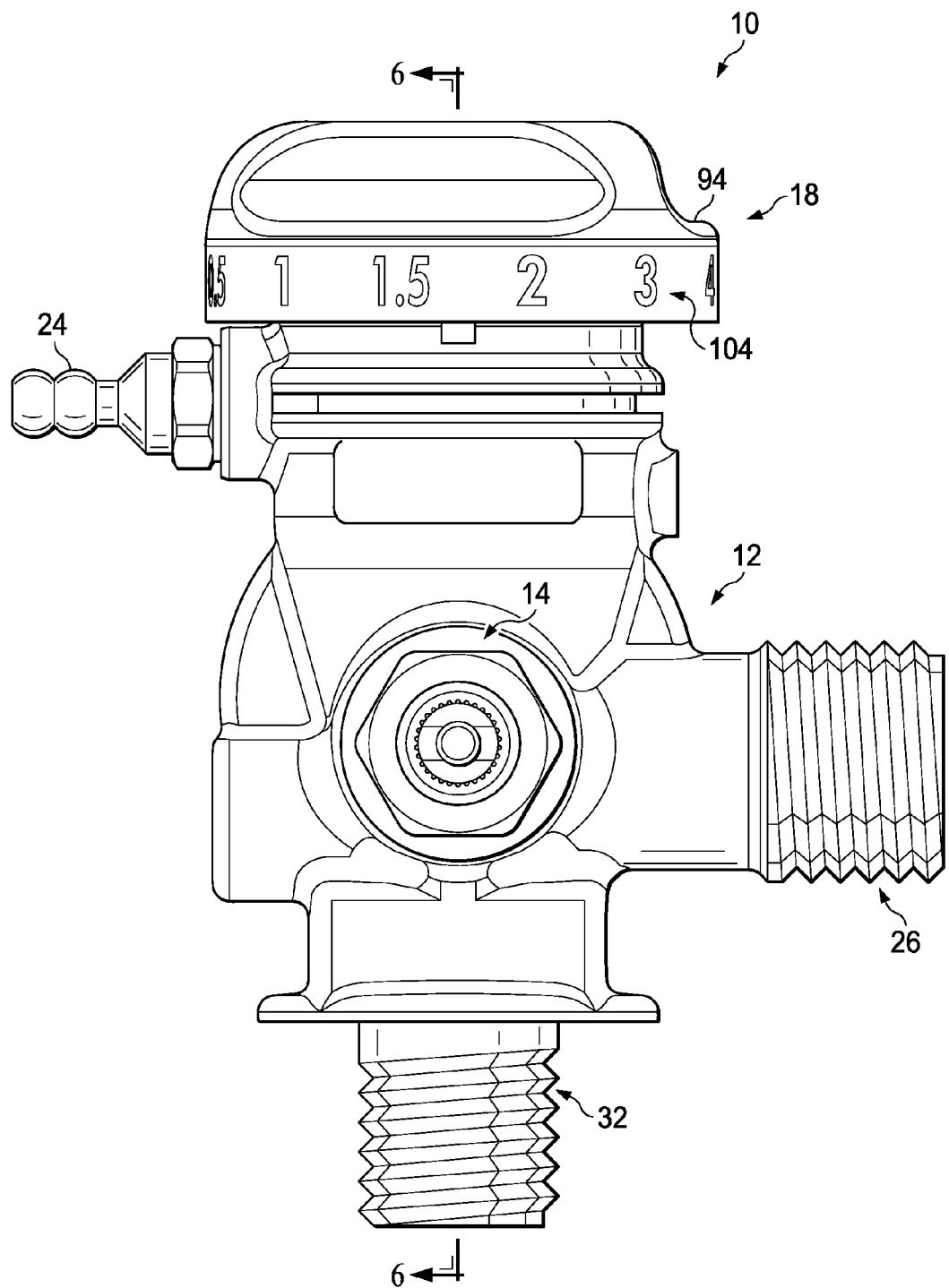
FIG. 4 is a front elevational view of the fluid control assembly of FIG. 1.
Figure 5:
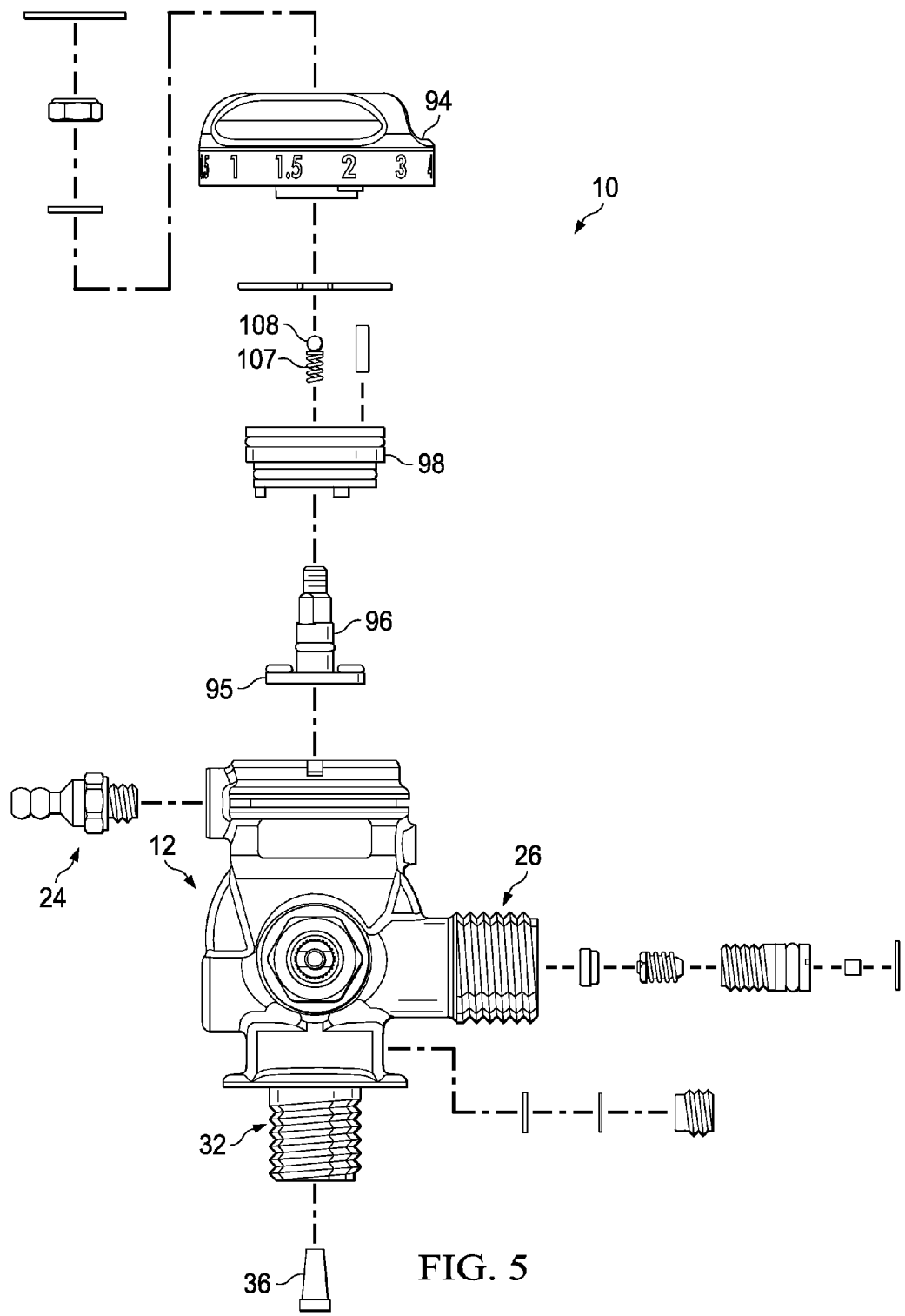
FIG. 5 is an exploded perspective view of the fluid control assembly of FIG. 1, with the fluid control assembly oriented as shown in FIG. 4.
Figure 18:
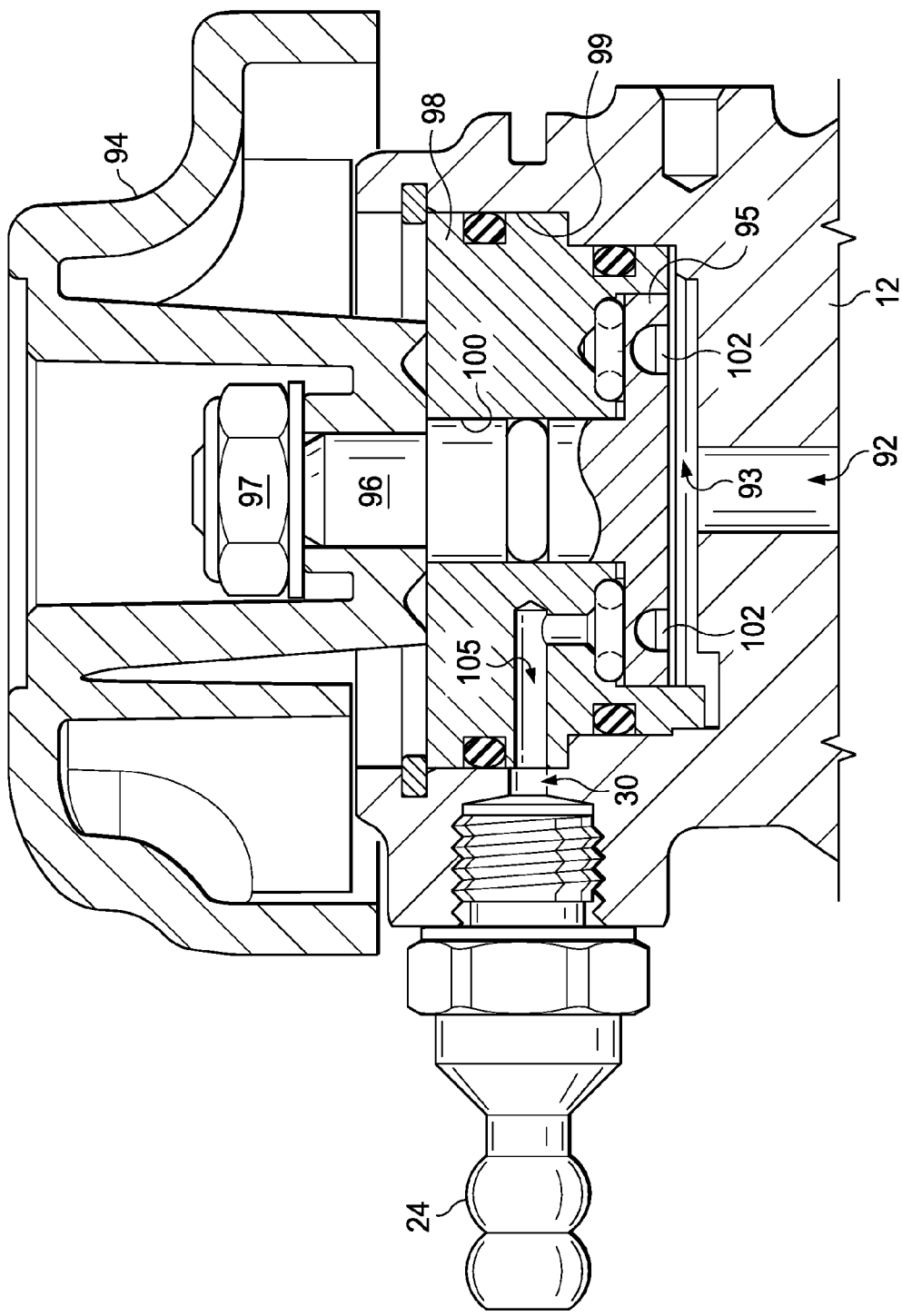
FIG. 18 is a cross-sectional view taken along line 18-18 in FIG. 2.
Figure 19:
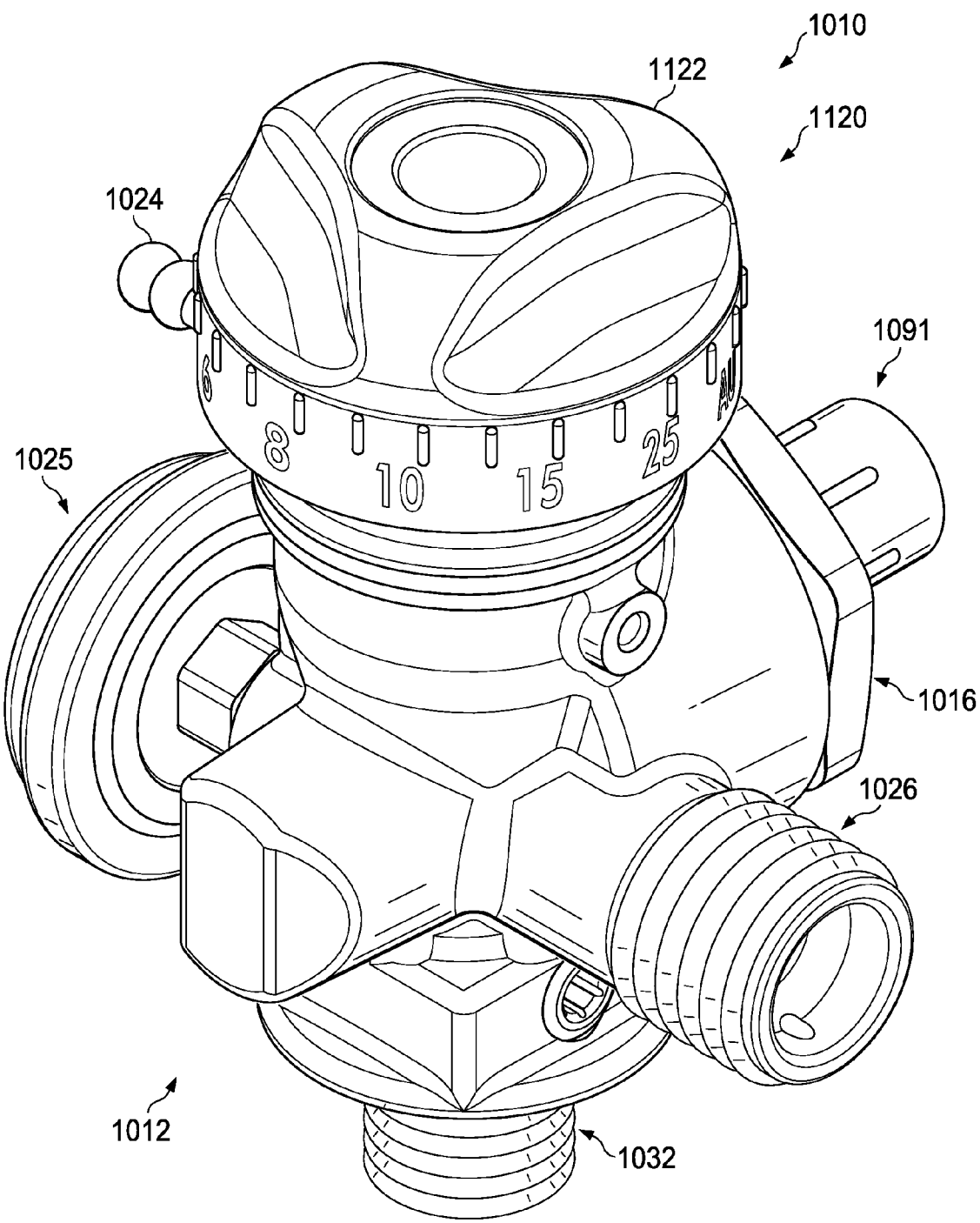
FIG. 19 is a perspective view depicting a fluid control assembly according to another embodiment.

The fluid control assembly 10 can also include an outlet barb 24 (FIG. 4) and a fill port 26 (FIG. 4). The body 12 can define a fluid inlet passage 28 (FIG. 6), and a fluid outlet passage 30 (FIG. 18). The fluid control assembly 10 can be configured to receive a pressurized fluid, from a source of pressurized fluid, and to discharge the pressurized fluid at a predetermined, regulated pressure, and at a desired (e.g., predetermined) flow rate, through the fluid outlet passage 30. The fluid outlet passage 30 can be in fluid communication with an internal passage (not shown) defined by the outlet barb 24, which can be configured to receive a cannula (not shown) of a fluid delivery system. Pressurized fluid discharging from the fluid outlet passage 30 can flow through the inlet passage defined by the outlet barb 24, and into the associated cannula. An opposite end of the cannula can be coupled with a medical device for use in supplying the pressurized fluid to a patient, for example.

In one embodiment, the body 12 of the fluid control assembly 10 can include a fluid inlet port 32, which can be configured for releasable attachment to a source of pressurized fluid, for example, a tank of pressurized gas, such as oxygen. In one embodiment, the fluid inlet port 32 can include a plurality of external threads, as shown in FIGS. 1-6, which can threadedly engage an outlet port of the source of pressurized fluid. The fluid inlet passage 28 can be in selective fluid communication with an internal chamber defined by the source of pressurized fluid, such that pressurized fluid can flow into the fluid inlet passage 28 as indicated by flow arrow 29 in FIG. 6. The fluid control assembly 10 can include a pressure gauge 25 (FIG. 1), which can be coupled with the body 12. The body 12 can define a passage 35 (FIG. 6), which can be in fluid communication with the fluid inlet passage 28 and the pressure gauge 25, such that the pressure gauge 25 can provide an indication of the pressure of the fluid within the fluid inlet passage 28.

Figure 6:
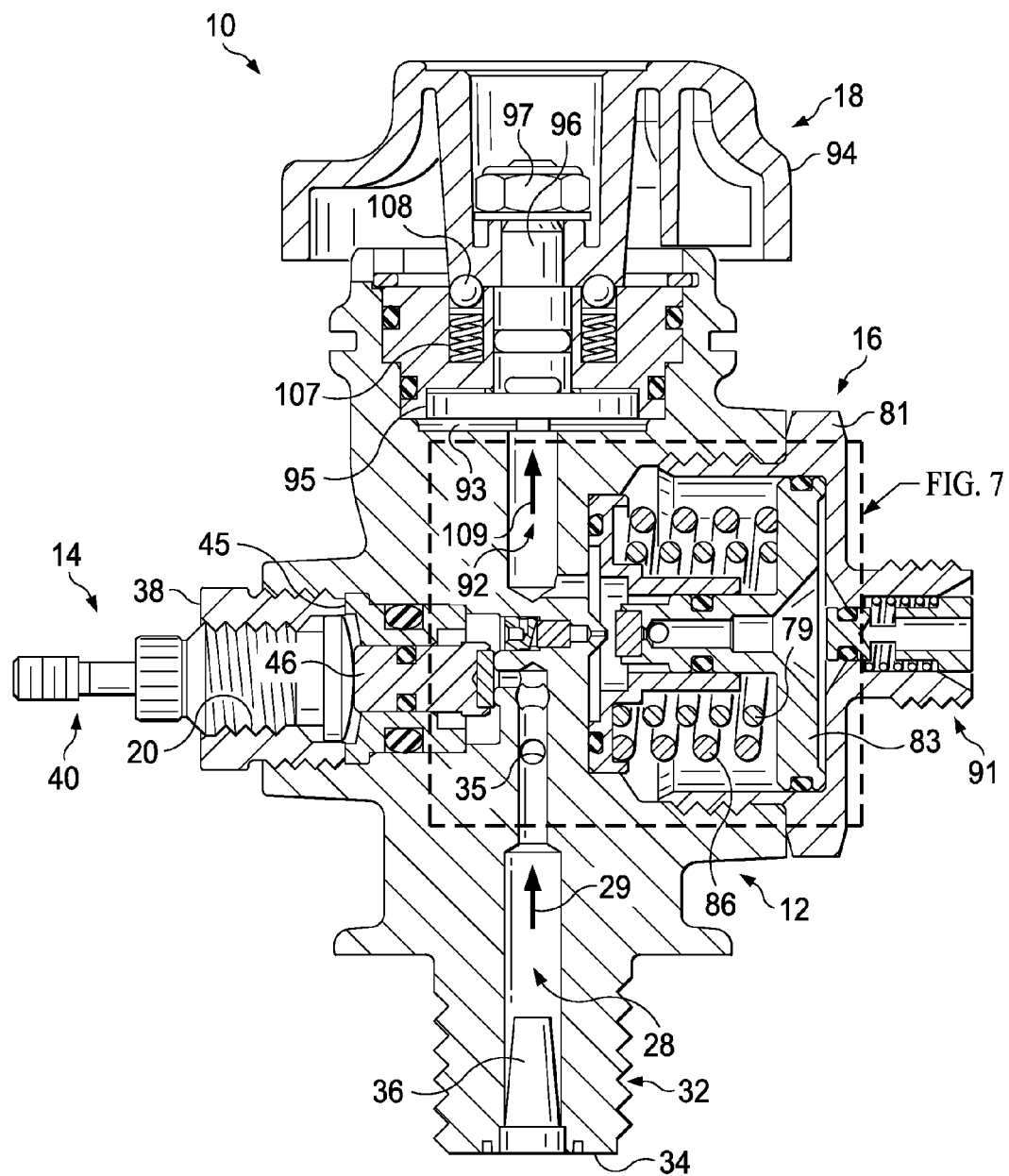
FIG. 6 is a cross-sectional view taken along line 6-6 in FIG. 4.
Figure 7:
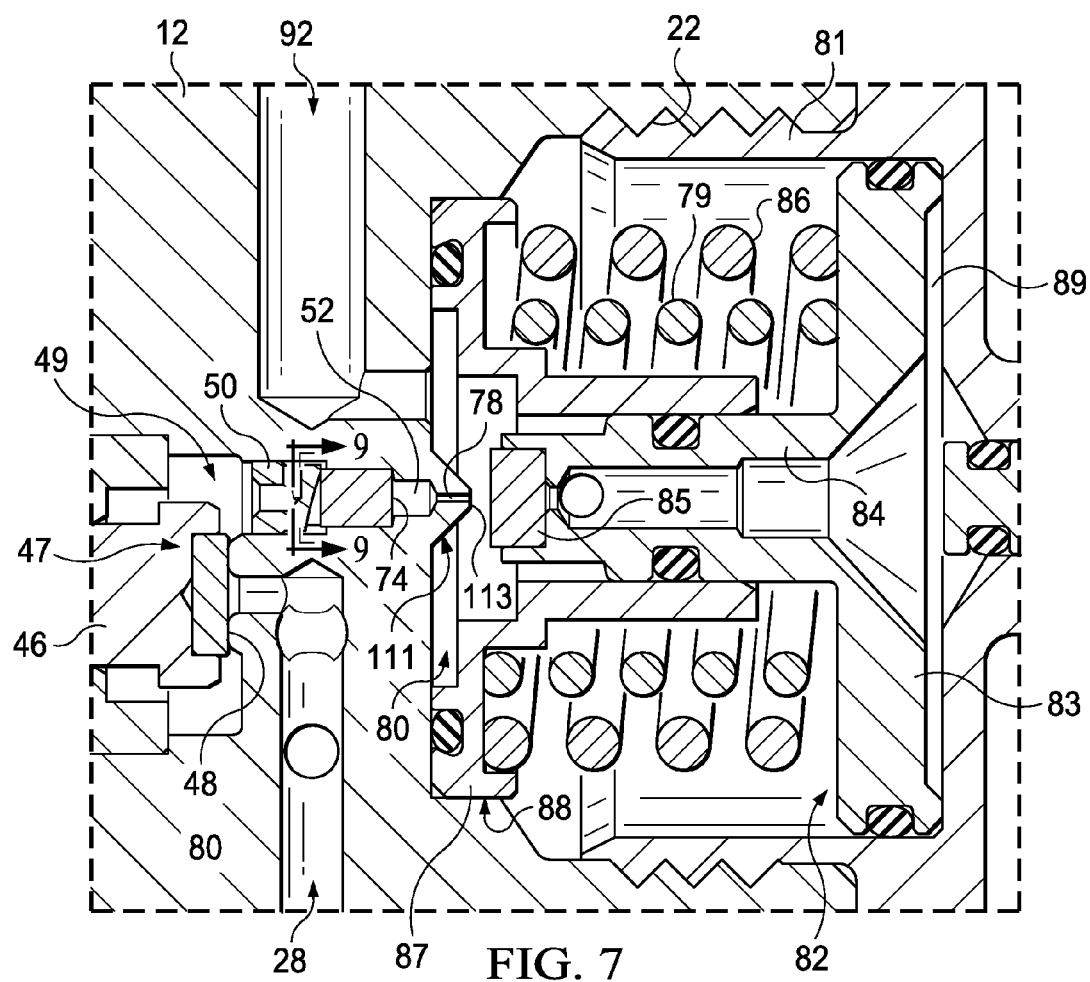
FIG. 7 is an enlarged view of an encircled portion of FIG. 6, with an isolation valve of the fluid control assembly of FIG. 1 being depicted in a closed position.

The fluid inlet port 32 of body 12 can include an end surface 34, as shown in FIG. 6. The fluid inlet passage 28 can extend from the end surface 34 of the fluid inlet port 32 in a downstream direction. The fluid control assembly 10 can include a filter 36, which can be positioned within the fluid inlet passage 28 adjacent to the end surface 34 of the fluid inlet port 32. The isolation valve 14 can include a guide 38, which can be threadedly engaged with the body 12, as shown in FIG. 6. The isolation valve 14 can also include an actuator 40 that can be threadedly engaged with the guide 38 and a rotatable knob 44 (FIG. 1) that can be secured to actuator 40. The knob 44 can be rotated by a user, causing the actuator 40 to rotate and translate relative to the guide 38.

Figure 8:
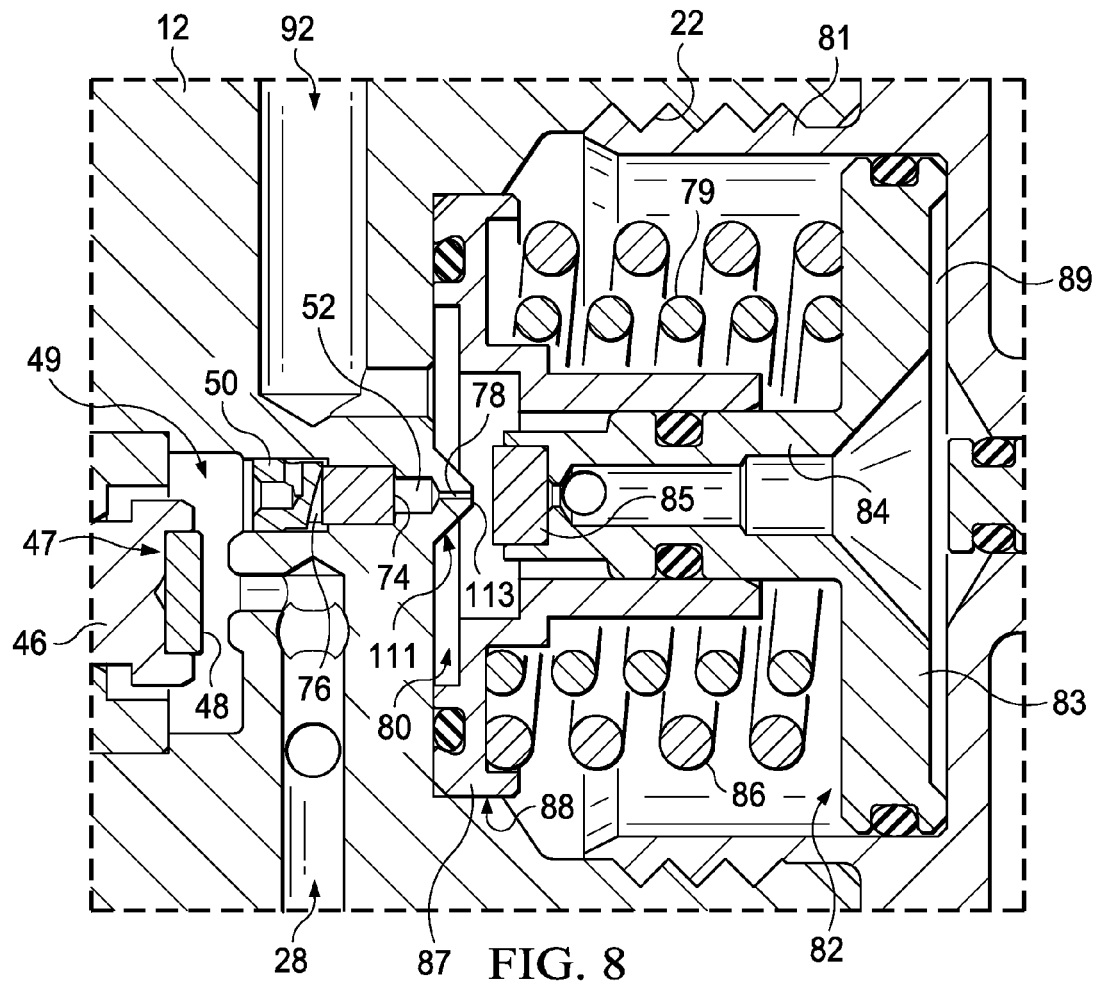
FIG. 8 is an enlarged view similar to FIG. 7, but with the isolation valve being depicted in an open position.

The isolation valve 14 can also include a bushing 45, a shuttle 46 and a valve seat 47 (FIGS. 7 and 8). In one embodiment, the valve seat 47 can be formed from a polymeric material. An external surface of the bushing 45 can engage the body 12 of the fluid control assembly 10. The bushing 45 can also include an internal surface that can define an interior cavity, which can be configured to receive the shuttle 46. The shuttle 46 can translate within the interior cavity relative to the bushing 45. One end of the shuttle 46 can be engaged with a distal end of the actuator 40, and an opposite end of the shuttle 46 can engage the valve seat 47. The fluid inlet passage 28 can extend to the isolation valve 14. Pressurized fluid within the fluid inlet passage 28 can exert a force against a side surface 48 (FIGS. 7 and 8) of the valve seat 47. This force can act in an outward direction, and can be reacted by the distal end of the actuator 40.

The isolation valve 14 can cooperate with the body 12, to define an isolation valve chamber 49 (FIGS. 7 and 8). FIG. 7 illustrates the isolation valve 14 in a closed position, while FIG. 8 illustrates the isolation valve 14 in an open position. When the isolation valve 14 is in a closed position, the valve seat 47 can be in contacting engagement with the body 12, and the fluid inlet passage 28 can be fluidically uncoupled from the isolation valve chamber 49. When the isolation valve 14 is an open position, the valve seat 47 can be spaced from the body 12 such that the fluid inlet passage 28 can be in fluid communication with the isolation valve chamber 49, as shown in FIG. 8. When a user desires to close the isolation valve 14, to prevent pressurized fluid supplied to the fluid inlet passage 28 from discharging through the fluid outlet passage 30 (FIG. 18) and out of the outlet barb 24, the user can rotate the knob 44 in a first direction to advance the actuator 40 and shuttle 46 inwardly, to force the valve seat 47 against the body 12, as shown in FIG. 7.

When a user desires to open the isolation valve 14 to permit a pressurized fluid, such as oxygen, to flow through the fluid control assembly 10, the user can rotate the knob 44 in an opposite direction such that the actuator 40 is translated outwardly. The pressurized fluid within the fluid inlet chamber 28, which acts on side surface 48 of valve seat 47, can force the valve seat 47 and shuttle 46 outwardly until the shuttle 46 contacts the distal end of the actuator 40. As a result, the valve seat 47 can be spaced from the body 12, such that the isolation valve 14 is in an open position, and fluid communication is established between the fluid inlet passage 28 and the isolation valve chamber 49. The isolation valve 14 can include a resistant seal, which can be an elastomeric O-ring, positioned in a channel defined by the bushing 45 to prevent pressurized fluid from leaking between the bushing 45 and body 12. Another resilient seal, which can also be an elastomeric O-ring, can be positioned in a channel defined by shuttle 46 to prevent pressurized fluid from leaking between the shuttle 46 and the bushing 45.

The fluid control assembly 10 can also include a flow path insert. The flow path insert can include a first portion and a second portion that can cooperate to define a first passage and a second passage that can be in fluid communication with each other. In one embodiment, the first passage and the second passage can intersect. The first portion can include a first end surface and a first peripheral surface. The second portion can include a second end surface and a second peripheral surface.

FIGS. 10-15 illustrate a flow path insert 50, according to one embodiment. In this embodiment, the first portion can be an upstream portion 54, the second portion can be a downstream portion 56, the first end surface can be an upstream end surface 58, the first peripheral surface can be an upstream peripheral surface 60, the second end surface can be a downstream end surface 62, and the second peripheral surface can be a downstream peripheral surface 64. Also, in this embodiment, the first passage can be an inlet passage 66 and the second passage can be an outlet passage 68. In other embodiments, flow path inserts such as flow path insert 50 can be inverted, or rotated about 180 degrees within the respective fluid control assembly such that the first portion can be a downstream portion, the second portion can be an upstream portion, the first passage can be an outlet passage and the second passage can be an inlet passage. This can be illustrated with the orientation of the flow path insert 2050*a* (FIG. 43), which can be configured the same as, or similar to, flow path insert 50, but can be rotated about 180 degrees relative to the orientation of flow path insert 50. The flow path insert 50 can be positioned within, and engaged with, the body 12. In one embodiment, the body 12 can define an isolation valve discharge passage 52 (FIGS. 7 and 8), which can be in fluid communication with the isolation valve chamber 49. In one embodiment, the flow path insert 50 can be positioned within the isolation valve discharge passage 52.

The downstream portion 56 can be integral with the upstream portion 54. In one embodiment, the upstream portion 54 and the downstream portion 56 can be made as a unitary structure. In one embodiment, the upstream portion 54 and the downstream portion 56 can be made as a unitary structure from an ignition-resistant material, which can be brass, or any other suitable ignition-resistant material and can be formed using any suitable process such as CNC machining, cast molding, or the like. Accordingly, the inlet passage 66 and the outlet passage 68 can be defined using any suitable process such as, boring, CNC machining, cast molding, or the like.

Figure 15:
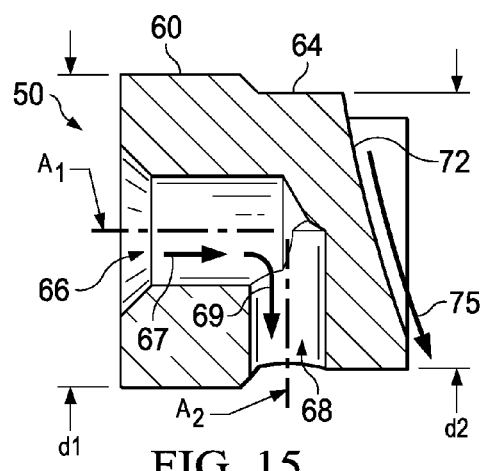
FIG. 15 is a longitudinal cross-sectional view of the flow path insert of FIG. 10.

The upstream portion 54 of the flow path insert 50 can include the upstream end surface 58 and the upstream peripheral surface 60. The upstream peripheral surface 60 can be cylindrical and can have a first diameter d1, as shown in FIG. 15. The upstream peripheral surface 60 can engage the body 12. In one embodiment, the upstream peripheral surface 60 can engage the body 12 in an interference, or press, fit. The downstream portion 56 of the flow path insert 50 can include the downstream end surface 62 and the downstream peripheral surface 64. The downstream peripheral surface 64 can be cylindrical and can have a second diameter d2 as shown in FIG. 15. The first diameter d1 can be greater than the second diameter d2.

The upstream portion 54 and the downstream portion 56 of the flow path insert 50 can cooperate to define the inlet passage 66 and the outlet passage 68, which can be in fluid communication with the inlet passage 66, and can intersect the inlet passage 66. The inlet passage 66 can extend through the upstream end surface 58 of the upstream portion 54 of the flow path insert 50 and can be in fluid communication with the isolation valve discharge passage 52 of the body 12. The inlet passage 66 can be longitudinally spaced from the downstream end surface 62. The outlet passage 68 can extend through the downstream peripheral surface 64 of the downstream portion 56 of the flow path insert 50. The outlet passage 68 can be spaced from each of the upstream end surface 58 of the upstream portion 54, and the downstream end surface 62 of the downstream portion 56, of the flow path insert 50.

The upstream portion 54 of the flow path insert 50 can define a first axis $A_1$, and the downstream portion 56 of the flow path insert 50 can define a second axis $A_2$, which can be transverse to the first axis $A_1$. In one embodiment, the second axis $A_2$ can be perpendicular to the first axis $A_1$. In one embodiment, the inlet passage 66 and the outlet passage 68 can be routed through the flow path insert 50 such that the first axis $A_1$ can extend longitudinally within the flow path insert 50, and the second axis $A_2$ can extend radially within the flow path insert 50, as shown in FIG. 15.

Figure 9:
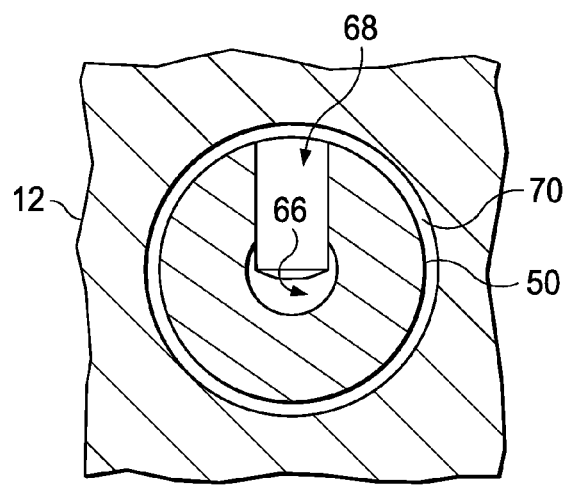
FIG. 9 is a cross-sectional view taken along line 9-9 in FIG. 7.
Figure 10:
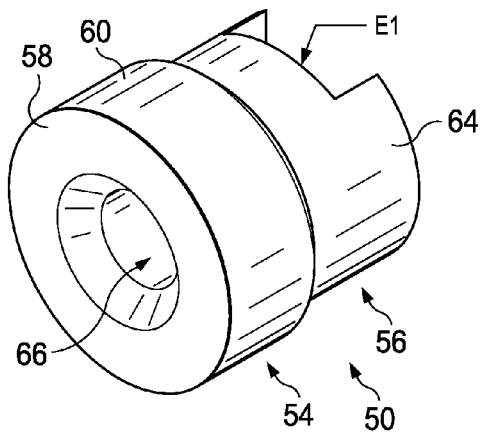
FIG. 10 is a top, upstream perspective view depicting a flow path insert according to one embodiment of the fluid control assembly of FIG. 1.
Figure 11:
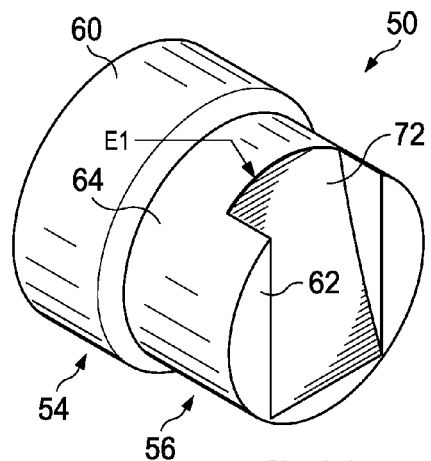
FIG. 11 is a top, downstream perspective view of the flow path insert of FIG. 10.
Figure 12:
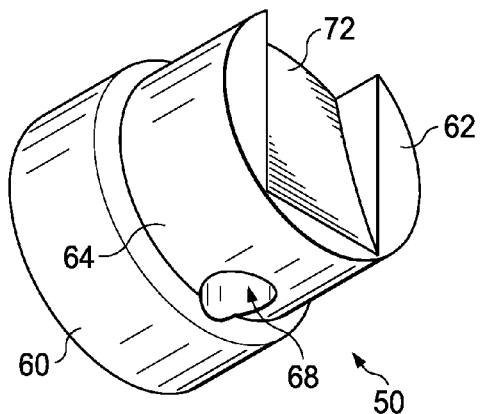
FIG. 12 is a bottom, downstream perspective view of the flow path insert of FIG. 10.
Figure 13:
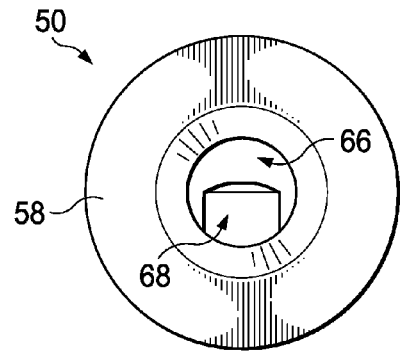
FIG. 13 is an upstream elevational view of the flow path insert of FIG. 10.
Figure 14:
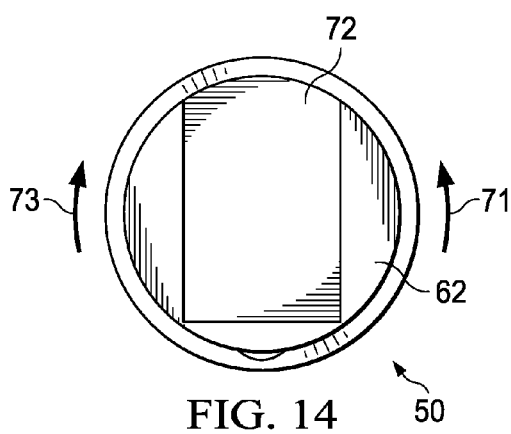
FIG. 14 is a downstream elevational view of the flow path insert of FIG. 10.

As a result of the relative sizes of the first diameter $d_1$ and the second diameter $d_2$, the downstream peripheral surface 64 of the downstream portion 56 of the flow path insert 50 can be spaced from the body 12, such that the flow path insert 50 can cooperate with at least the body 12 to define an annular passage 70, as shown in FIG. 9. The annular passage 70 can be in fluid communication with the outlet passage 68. The downstream portion 56 of the flow path insert 50 can also include an outer, inclined surface 72, which can extend from the downstream peripheral surface 64 to the downstream end surface 62, as shown in FIG. 11. The intersection of the outer inclined surface 72 and the downstream peripheral surface 64 can define an edge E1.

The annular passage 70 can be a portion of the isolation valve discharge passage 52. The fluid control assembly 10 can include a flow path component 74 (FIG. 7) which can be positioned within the body 12, downstream of the flow path insert 50. In one embodiment, the flow path component 74 can be a filter. The flow path component 74 can be positioned within the isolation valve discharge passage 52, and can be in contacting engagement with the flow path insert 50. As shown in FIGS. 7 and 8, an upstream end of the flow path component 74 can be in contacting engagement with the flow path insert 50 and a downstream end of the flow path component 74 can be in contacting engagement with the body 12, such that the flow path insert 50 can facilitate maintaining the flow path component 74 in a fixed position with respect to the body 12. A portion of the upstream end of the flow path component 74 can cooperate with the flow path insert 50 and the body 12 to define the annular passage 70.

The inclined surface 72 of the downstream portion 56 of the flow path insert 50 can cooperate with the flow path component 74 and the body 12 to define an inclined passage 76 (FIG. 8), which can be in fluid communication with the annular passage 70, and with the flow path component 74. The combination of the inlet passage 66, the outlet passage 68, the annular passage 70, and the inclined passage 76 can create a tortuous flow path for pressurized gas flowing through the flow path insert 50. For example, pressurized gas entering the inlet passage 66 can flow longitudinally through the inlet passage 66 along the axis $A_1$, as indicated by flow arrow 67 in FIG. 15, and then can be forced to turn relative to the axis $A_1$, which can be a 90 degree turn, as indicated by flow arrow 69 in FIG. 15, as required to flow along the axis $A_2$ defined by the outlet passage 68. The pressurized gas discharging from the outlet passage 68 can then flow into the annular passage 70. The location where the outlet passage 68 extends through the downstream peripheral surface 64 can be circumferentially spaced from the location where the inclined surface 72 intersects the downstream peripheral surface 64 (e.g., edge E1). In one embodiment, the circumferential spacing can be about 180 degrees.

Accordingly, pressurized gas discharging from the outlet passage 68 can flow in both clockwise and counter-clockwise directions through the annular passage 70, around the downstream peripheral surface 64, as indicated by flow arrows 71 and 73 in FIG. 15, to an entrance of the inclined passage 76, i.e., the edge E1. The pressurized fluid can then flow along the inclined surface 72, as indicated by flow arrow 75 in FIG. 14, and into the upstream end of the flow path component 74. Pressurized fluid can then flow through the flow path component 74 and into a remainder of the isolation valve discharge passage 52 that extends downstream from the flow path component 74 to a regulator inlet orifice 78 that can be defined by the body 12. The regulator inlet orifice 78 can be in fluid communication with the isolation valve discharge passage 52, and can be in at least intermittent fluid communication with a regulator chamber 80 that can be at least partially defined by the pressure regulator 16. As shown in FIGS. 7 and 8, the pressure regulator 16 can cooperate with the body 12 to define the regulator chamber 80. The body 12 can include a regulator seat interface portion 111, which can define the regulator inlet orifice 78. The regulator seat interface portion 111 can be a machined portion of the body 12. In one embodiment, the regulator seat interface portion 111 can have a frusto-conical shape, and can include a plateau 113, which can be planar.

The inlet passage 66, the outlet passage 68, the annular passage 70, and the inclined passage 76, of the flow path insert 50, and the regulator inlet orifice 78, can each have a flow coefficient, with flow coefficient being commonly designated in the art as $C_v$. The flow coefficient of each one of the inlet passage 66, the outlet passage 68, the annular passage 70, and the inclined passage 76, can be greater than the flow coefficient of the regulator inlet orifice 78 to prevent a "choked flow" condition. This can avoid an associated, undesirable performance of the pressure regulator 16.

In one embodiment, the pressure regulator 16 can be a piston-type pressure regulator. In such an embodiment, the pressure regulator 16 can include a housing 81 (FIGS. 7 and 8), which can threadedly engage the body 12. A portion of the housing 81 can be positioned within the second cavity 22. The pressure regulator 16 can also include a piston 82 which can include a disk 83 and a stem 84, which can be integral with the disk 83. A regulator seat 85, which can be formed from a polymeric material, can be secured to a distal end of the stem 84. An inner resilient member 79 and an outer resilient member 86, which can each be a coil spring as shown in FIGS. 6-8, can be positioned between the disk 83 of the piston 82, and a flange 87 of a guide 88. The guide 88 can have a cylindrical portion disposed in surrounding relationship with the stem 84. The plateau 113 of the regulator seat interface portion 111 of body 12 can be positioned in a confronting relationship with the regulator seat 85.

The pressure regulator 16 can be configured to define a combination of passages and cavities, which can distribute pressurized gas from the regulator chamber 80 to a low pressure chamber 89, which can be partially defined by the disk 83 of the piston 82. The pressure of the fluid, such as oxygen, flowing through the regulator inlet orifice 78 can be relatively high, for example about 2,000 psig. A transition from this relatively high pressure to a relatively low pressure, for example, about 50 psig, can occur at an end of the regulator inlet orifice 78 that is adjacent to the regulator seat 85. Fluid from the regulator inlet orifice 78 can flow into the regulator chamber 80 and can flow through the stem 84 to the low pressure chamber 89. The piston 82 can accordingly operate in a reciprocating manner in response to the respective biasing forces from the resilient members 79 and 86 as well as the difference in pressure between the regulator chamber 80 and the low pressure chamber 89 which can urge the movement of the piston 82 to a position that facilitates regulation of the pressure within the regulator chamber 80 to a substantially constant pressure. It will be appreciated that, in other embodiments, flow path inserts, such as flow path insert 50, can be used in fluid control assemblies that can include pressure regulators having different configurations, such as diaphragm-type pressure regulators.

The fluid control assembly 10 can include an auxiliary valve 91 (FIG. 6), which can extend outwardly away from the housing 81 (FIG. 8) of the pressure regulator 16. The auxiliary valve 91 can define an interior chamber which can be in selective fluid communication with the low pressure chamber 89. Fluid communication can be established between the interior chamber defined by the auxiliary valve 91 and the low pressure chamber 89 by depressing a portion of the auxiliary valve 91. A pneumatic tool, such as a medical device, can be selectively coupled with the auxiliary valve 91 (e.g., through threaded engagement of an associated hose) to facilitate powering of the medical device from the auxiliary valve 91. Coupling of the pneumatic tool, or associated hose, to the auxiliary valve 91 can facilitate depression of the portion of the auxiliary valve 91 to facilitate use of the auxiliary valve 91 as a "power takeoff" with pressurized fluid being supplied to operate pneumatic tool from the auxiliary valve. In some embodiments, a cap (not shown) can be releasably attached to the auxiliary valve 91, when not in use, to prevent inadvertent actuation of the auxiliary valve 91.

Regulated, low pressure fluid, which can be a gas such as oxygen, can discharge from the regulator chamber 80 into a regulator discharge passage 92 which can be defined by the body 12. Pressurized fluid can flow through the regulator discharge passage 92 to a flow control inlet chamber 93, which can be defined in part by the body 12, as indicated by flow arrow 109 in FIG. 6. The control valve 18 can include a knob 94, which can be rotatably coupled with the body 12. As illustrated in FIGS. 6 and 18, the control valve 18 can also include an orifice plate 95 and a coupling member 96. One end of the coupling member 96 can be integral with the orifice plate 95, and an opposite end of the coupling member 96 can be secured to the knob 94. For example, the coupling member 96 can be releasably secured to the knob 94 with a fastener, such as a nut 97, which can threadedly engage the coupling member 96. Accordingly, the orifice plate 95 and coupling member 96 can rotate together with the knob 94. The control valve 18 can also include a guide 98, which can be positioned within a cavity 99 that can be defined by the body 12. As shown in FIG. 18, a portion of the coupling member 96 can extend through a passage 100 defined by the guide 98.

Figure 17:
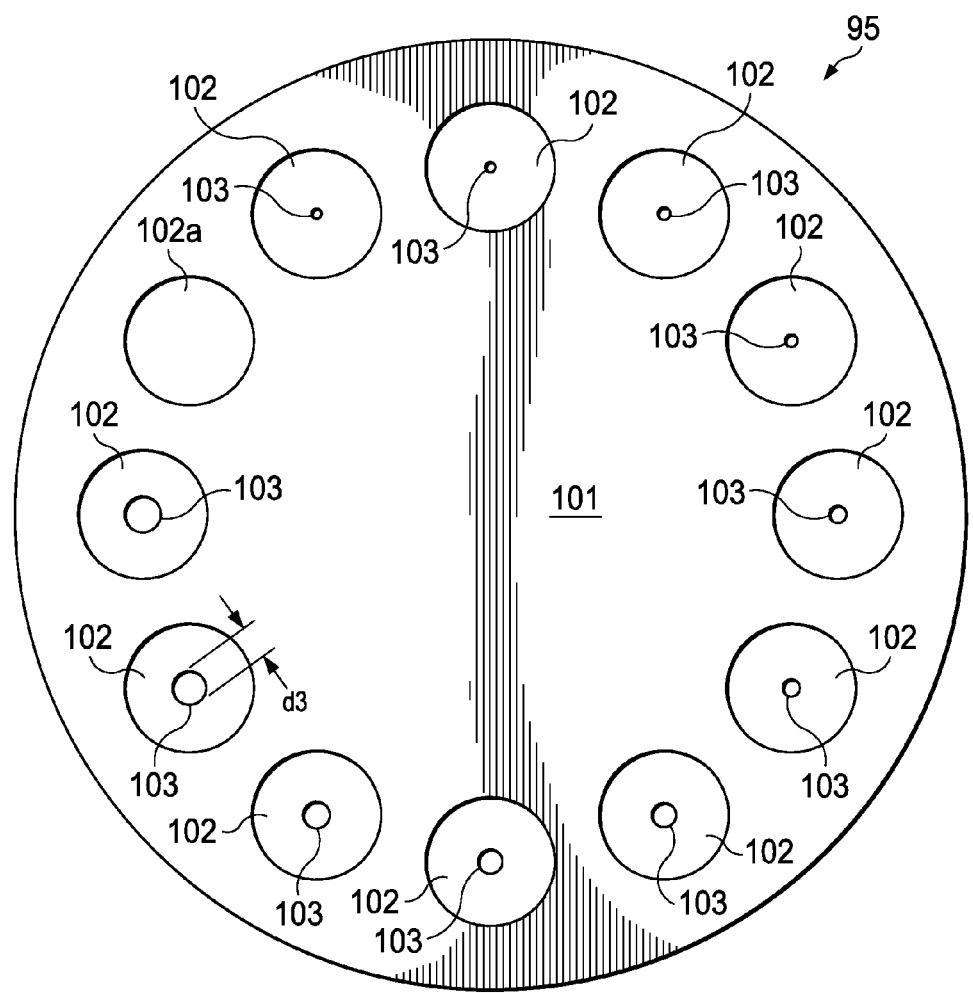
FIG. 17 is a plan view of an upstream surface of an orifice plate of a control valve of the fluid control assembly of FIG. 1.

As shown in FIG. 17, the orifice plate 95 can include an upstream surface 101. The upstream surface 101 can define a plurality of circumferentially spaced recessed areas 102, or counterbores. The recessed areas 102 can be equally spaced circumferentially from one another. In one embodiment, the upstream surface 101 of the orifice plate 95 can define twelve circumferentially spaced recessed areas 102. The orifice plate 95 can define a plurality of orifices 103, which can extend through the orifice plate 95. Each of the orifices 103 can be positioned within a respective one of the recessed areas 102, as shown in FIG. 17. In one embodiment, the orifice plate 95 can define eleven of the orifices 103, with no orifice being positioned within one of the recessed areas, identified as 102a. The orifices 103 can have a circular cross-sectional shape, having a diameter d3, shown in FIG. 17 for one of the orifices 103. The diameter d3 of the orifices 103 can vary in size. In one embodiment, the diameter $d_3$ of each of the orifices 103 can be different than the diameter d3 of each of the other ones of the orifices 103. In another embodiment, some of the orifices 103 can have the same size diameter d3.

The knob 94 of the control valve 18 can include a plurality of circumferentially spaced indicia, indicated generally at 104 in FIG. 1. Each of the indicia 104 can correspond to a flow rate of fluid discharging through the fluid outlet passage 30, in any desired unit of flow rate. When a user desires to discharge pressurized fluid through the fluid outlet passage 30, the user can rotate the knob 94, which also rotates the orifice plate 95, until a respective one of the orifices 103 is aligned with a flow control outlet passage 105 (FIG. 18), which can be defined by the guide 98. An indicator (not shown) can be provided so that a desired flow rate can be achieved when the corresponding indicia 104 are aligned with the indicator. The fluid control assembly 10 can be calibrated to provide correspondence between each indicated flow rate, and the alignment of the flow control outlet passage 105 with the respective one of the orifices 103 that is required to achieve the indicated flow rate. When a "no flow" condition is desired, a user can rotate the knob 94 as required to align the recessed area 102a in the orifice plate 95 with the flow control inlet passage 105, such that the flow control inlet passage 105 and the flow control inlet chamber 93 are fluidically uncoupled. The flow control outlet passage 105 can be in fluid communication with the fluid outlet passage 30, which can be in fluid communication with the interior passage (not shown) defined by the outlet barb 24. This can permit pressurized fluid to be provided through the outlet barb 24 to a flow passage defined by a cannula (not shown) of a fluid delivery system.

The knob 94 of the control valve 18 can include a plurality of circumferentially spaced indentations (not shown). The guide 98 can define a plurality of circumferentially spaced cavities, which can have a like number as the indentations formed in the knob 94. The flow control assembly 10 can also include a plurality of biasing members 107, which can be coil springs as shown in FIG. 6. Each of the biasing members 107 can be positioned within a respective one of the cavities defined by the guide 98. The fluid control assembly 10 can also include a plurality of contact members 108, which can be spherical balls. Each of the contact members 108 can be positioned in contacting engagement with a respective one of the biasing members 107. There can be an equal number of contact members 108 and detents formed in the knob 94 of control valve 18. Each of the biasing members 107 can bias the corresponding contact member 108 toward the knob 94. Each of the contact members 108 can engage one of the detents formed in the knob 94 of the control valve 18, which can facilitate maintaining the knob 94 in a desired position for a particular flow rate.

Figure 16:
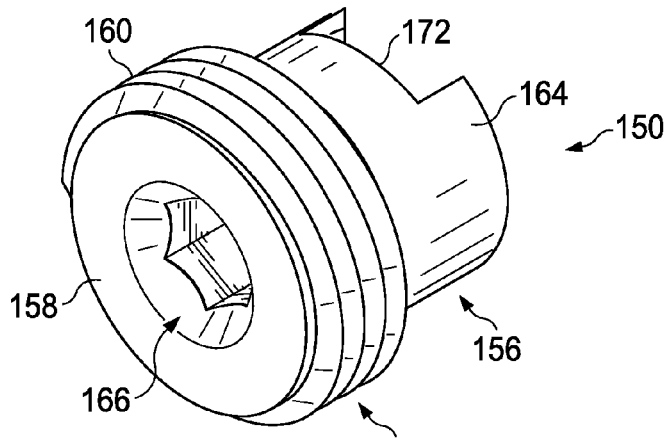
FIG. 16 is a top, upstream perspective view depicting a flow path insert according to another embodiment.

FIG. 16 illustrates a flow path insert 150 according to another embodiment. The flow path insert 150 can be used in various fluid control assemblies, such as, in fluid control assembly 10 in lieu of, or in addition to, the flow path insert 150, for example. The flow path insert 150 can include an upstream portion 154 and a downstream portion 156 that can be integral with the upstream portion 154. The upstream portion 154 and the downstream portion 156 can cooperate to define an inlet passage 166 and an outlet passage (not shown). The upstream portion 154 can include an upstream end surface 158, and the inlet passage 166 can extend through the upstream end surface 158. The upstream portion 154 can include an upstream peripheral surface 160, which can define a plurality of external threads. The downstream portion 156 can include a downstream peripheral surface 164, and can include an inclined surface 172 that can extend from the downstream peripheral surface 164 to a downstream end surface of the downstream portion 156. The external threads defined by the upstream peripheral surface 160 can threadedly engage a body of a fluid control assembly, such as the body 12, for example, which can secure the flow path insert 150 to the body 12. A hexagonally shaped recessed area can be formed in the body 12, within the inlet passage 166 and proximate to the upstream end surface 158, to facilitate installing the flow path insert 150.

FIG. 49 illustrates a flow path insert 250 according to another embodiment. The flow path insert 250 can include a first portion 254, which can include a first end surface 258 and a first peripheral surface 260. The flow path insert 250 can also include a second portion 256, which can include a second end surface 262 and a second peripheral surface 264. The second portion 256 can also include a ring 251. The second peripheral surface 264 can extend between the first portion 254, which can be a ring, and the ring 251 of the second portion 256. The first portion 254 can be integral with the second portion 256. In one embodiment, the first portion 254 and the second portion 256 can be made as a unitary structure from an ignition-resistant material, which can be brass, or any other suitable ignition-resistant material, such as, for example, bronze or copper, and can be formed using any suitable process such as CNC machining, cast molding, or the like.

The first portion 254 and the second portion 256 can cooperate to define a first passage 266 and a second passage 268. In one embodiment, each of the first passage 266 and the second passage 268 can be generally L-shaped as shown in FIG. 49. The first passage 266 can extend through the first end surface 258 and can extend through the second peripheral surface 264. The second passage 268 can extend through the second peripheral surface 264 and can extend through the second end surface 262. The first peripheral surface 260 can have a diameter d6 and the second peripheral surface 264 can have a diameter d7, which can be smaller than the diameter d6. The ring 251 of the second portion 256 can have a diameter d8. In one embodiment, the diameter d8 can be about the same as the diameter d6.

The flow path insert 250 can be used in various fluid control assemblies. For example, the flow path insert 250 can be used in the fluid control assembly 10 in lieu of, or in addition to, the flow path insert 50. When the flow path insert 250 is positioned within a body of a fluid control assembly, for example, body 12 of fluid control assembly 10, the first peripheral surface 260 and an outer surface of the ring 251 can be in contacting engagement with the body of the fluid control assembly, and the second peripheral surface 264 can be spaced from the body. As a result, the first portion 254, the ring 251 of the second portion 256, and the second peripheral surface 264 can cooperate with the body of the fluid control assembly to define an annular passage (not shown), which can be in fluid communication with each of the first passage 266 and the second passage 268. As shown in FIG. 49, the first passage 266 and the second passage 268 can be spaced apart, but can be in fluid communication with each other when the flow path insert 250 is positioned within a body of a fluid control assembly, such as, for example, via an annular passage.

The flow path insert 250 can be symmetrical such that, in one embodiment, the first portion 254 can be an upstream portion, the second portion 256 can be a downstream portion, the first passage 266 can be an inlet passage and the second passage 268 can be an outlet passage. In another embodiment, the flow path insert 250 can be oriented within the body of the respective fluid control assembly such that the first portion 254 is a downstream portion, the second portion 256 is an upstream portion, the first passage 266 is an outlet passage, and the second passage 268 is an inlet passage.

FIGS. 19-41 illustrate a fluid control assembly 1010 according to another embodiment. Similar to the fluid control assembly 10, the fluid control assembly 1010 can be included in a system for delivering a pressurized fluid. The pressurized fluid can be a gas, such as oxygen, which can be delivered to a patient. Also, the fluid control assembly 1010 can be used in any other suitable application, for example, with industrial gas regulators, or any other assembly utilizing a regulator for the delivery of a gas. In one embodiment, the fluid control assembly 1010 can include a body 1012 and a pressure regulator 1016 that can be coupled with the body 1012. The fluid control assembly 1010 can also include a multi-function valve 1120, which can be coupled with the body 1012. The multi-function valve 1120 can include a knob 1122, which can be rotatably coupled with the body 1012. At least a portion of the pressure regulator 1016 can be positioned within a cavity 1022 (FIG. 24) that can be defined by the body 1012. The fluid control assembly 1010 can also include at least one pressure gauge, for example, pressure gauge 1025, which can provide an indication of the pressure of the pressurized fluid within the fluid control assembly 1010, at one or more locations of interest.

Figure 41:
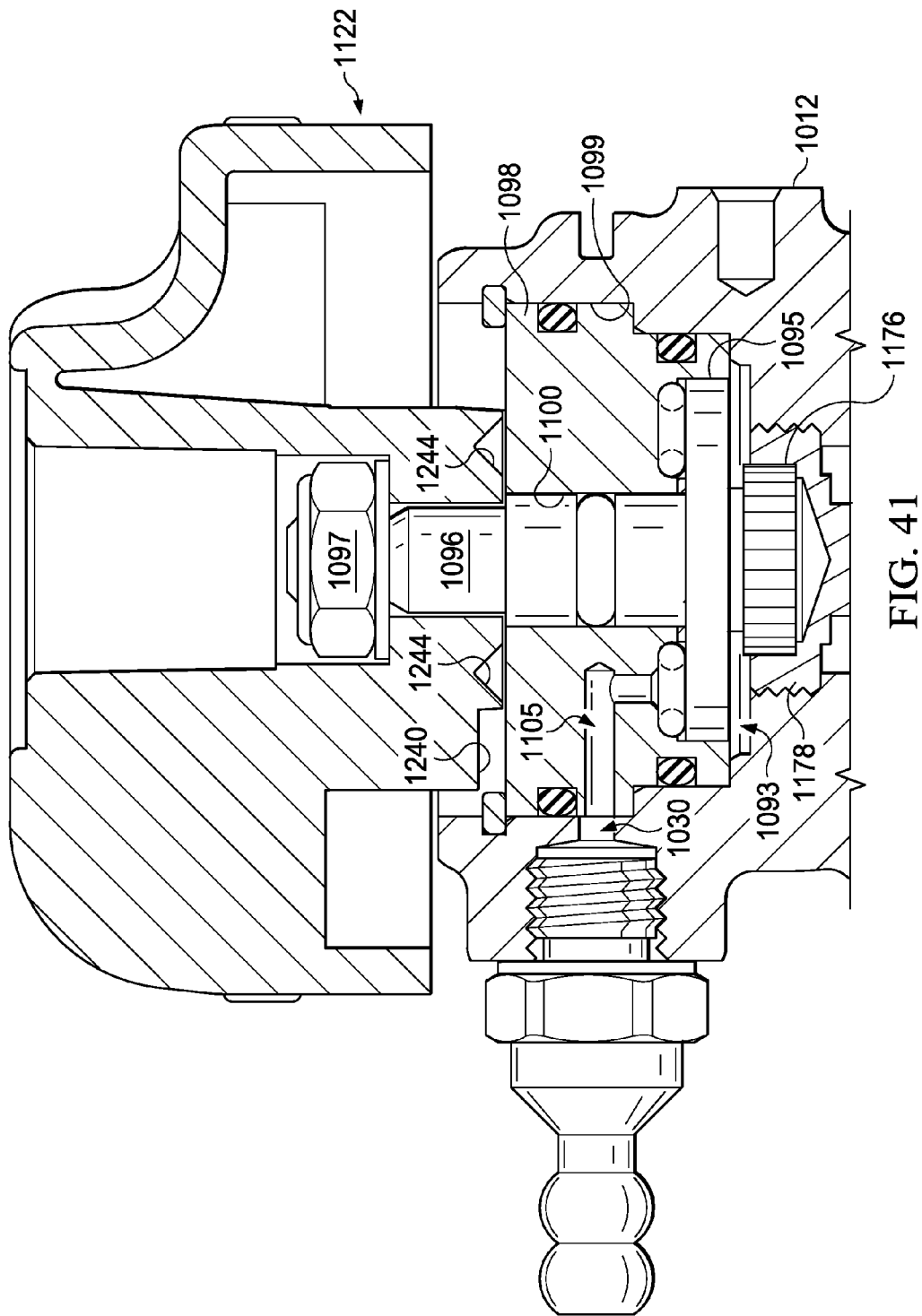
FIG. 41 is a cross-sectional view taken along line 41-41 in FIG. 20.

The fluid control assembly 1010 can include an outlet barb 1024 and a fill port 1026. The body 1012 can define a fluid inlet passage 1028 (FIG. 24) and a fluid outlet passage 1030 (FIG. 41). The fluid control assembly 1010 can be configured to receive a pressurized fluid, from a source of pressurized fluid, and to discharge the pressurized fluid at a predetermined, regulated pressure, and at a desired flow rate, through the fluid outlet passage 1030. The fluid outlet passage 1030 can be in fluid communication with an internal passage (not shown) of the outlet barb 1024, which can be configured to receive a cannula (not shown) of a fluid delivery system. Pressurized fluid discharging from the fluid outlet passage 1030 can flow into an inlet passage (not shown) defined by the outlet barb 1024, and through the associated cannula. An opposite end of the cannula can be coupled with a device configured for a particular application, for example, a medical device for use in supplying the pressurized fluid to a patient.

Figure 24:
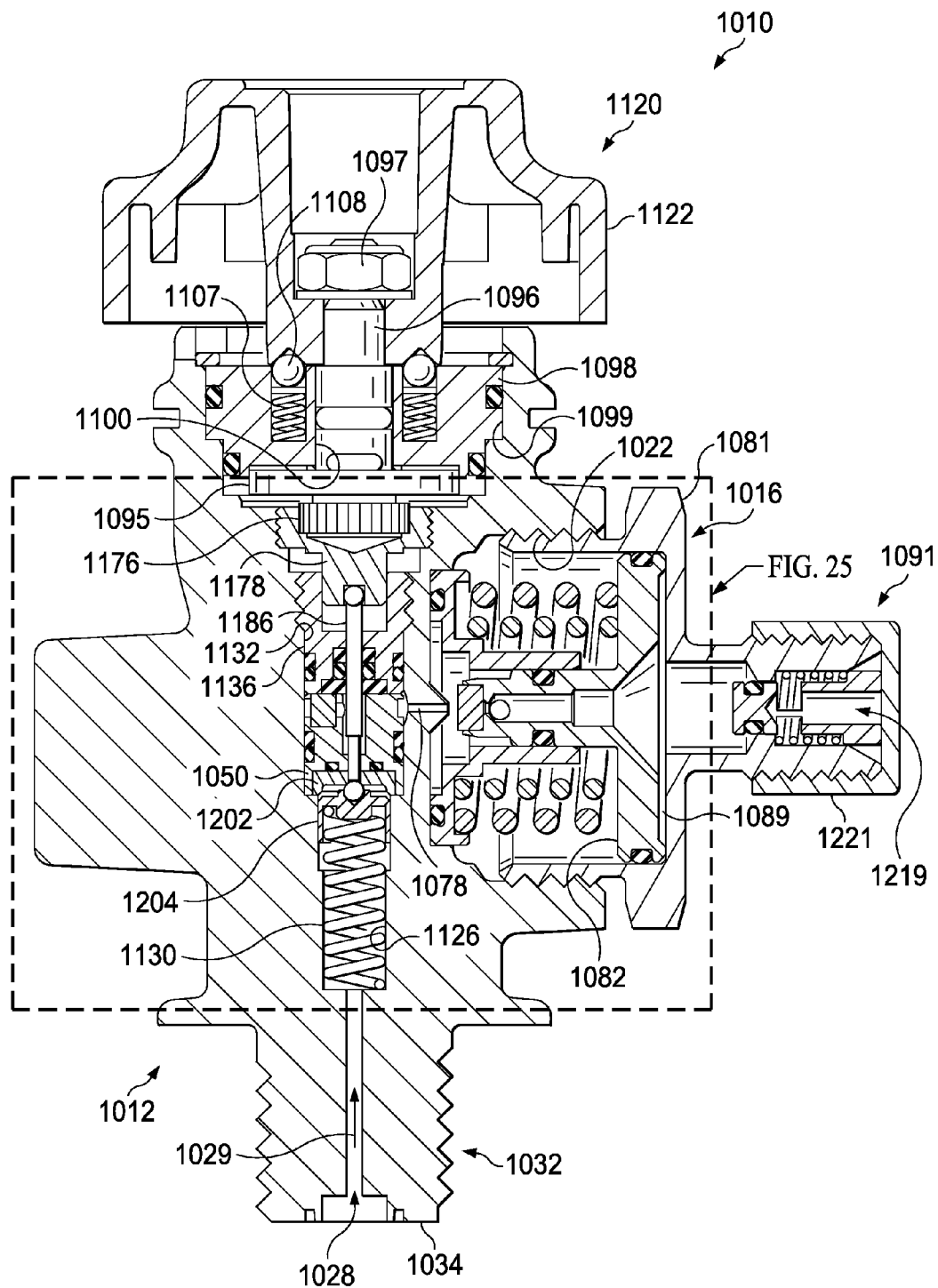
FIG. 24 is a cross-sectional view taken along line 24-24 in FIG. 22.

In one embodiment, the body 1012 of the fluid control assembly 1010 can include a fluid inlet port 1032, which can be configured for releasable attachment to a source of pressurized fluid, for example, a tank of pressurized gas, such as oxygen. In one embodiment, the fluid inlet port 1032 can include a plurality of external threads, as shown in FIGS. 19-24, which can threadedly engage an outlet port of the source of pressurized fluid. The fluid inlet passage 1028 can be in selective fluid communication with an internal chamber defined by the source of pressurized fluid. The fluid inlet port 1032 of the body 1012 can include an end surface 1034, as shown in FIG. 24. The fluid inlet passage 1028 can extend continuously downstream away from the end surface 1034 of the fluid inlet port 1032 and into the body 1012. In one embodiment, the fluid inlet passage 1028 can extend continuously, linearly downstream away from the end surface 1034 of the fluid inlet port 1032.

The body 1012 can define a cavity 1126, which can be in fluid communication with the fluid inlet passage 1028. Pressurized fluid from a source of pressurized fluid can flow into and through the fluid inlet passage 1028 as indicated by flow arrow 1029 in FIG. 24. The fluid control assembly 1010 can include a biasing member 1130, which can be positioned within the cavity 1126. In one embodiment, the biasing member 1130 can be a coil spring. The biasing member 1130 can be used to bias a valve structure toward a closed position, for example, as subsequently described, to isolate the fluid inlet passage 1028 from the fluid outlet passage 1030, i.e., to prevent a pressured fluid from flowing through the fluid control assembly 1010 from the fluid inlet passage 1028 to the fluid outlet passage 1030.

Figure 25:
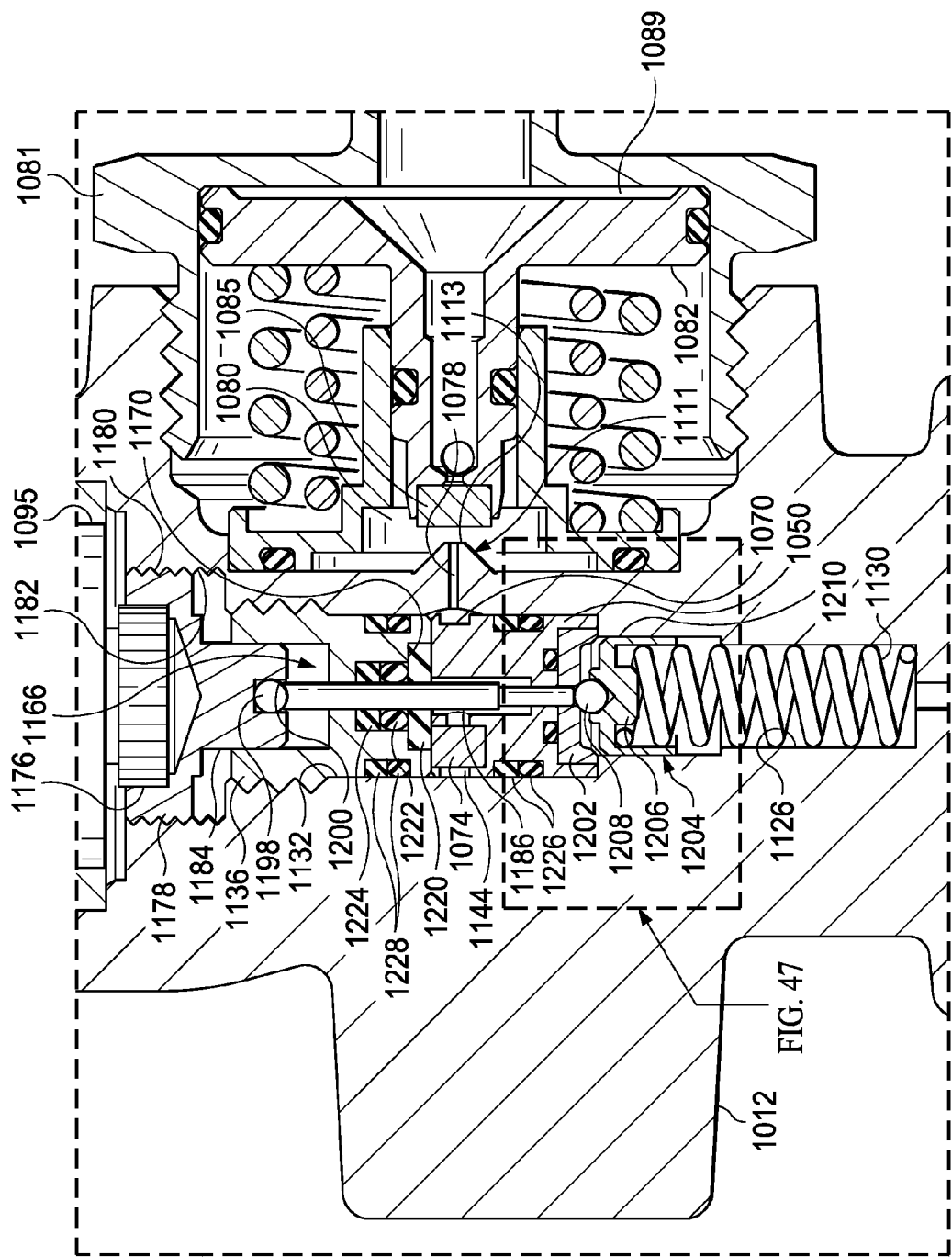
FIG. 25 is an enlarged view of an encircled portion of FIG. 24.
Figure 26:
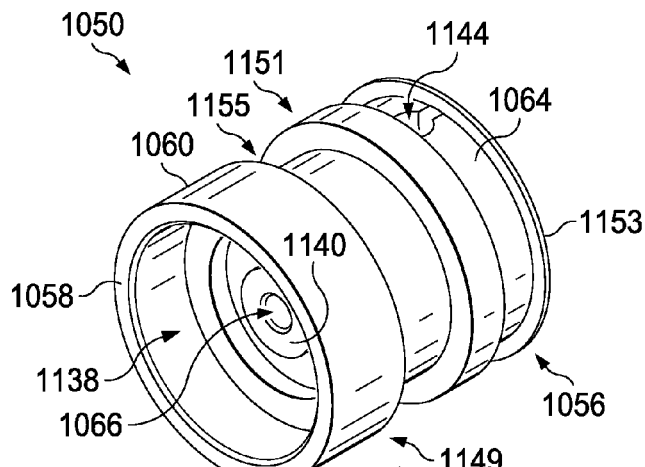
FIG. 26 is a top, upstream perspective view depicting an flow path insert according to another embodiment, of the fluid control assembly of FIG. 19.
Figure 27:
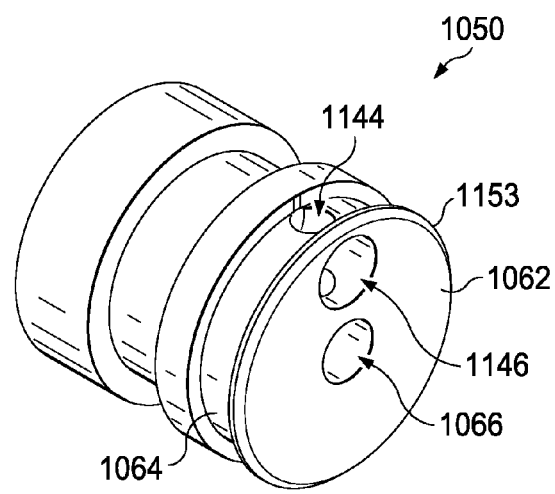
FIG. 27 is a top, downstream perspective view of the flow path insert of FIG. 26.
Figure 28:
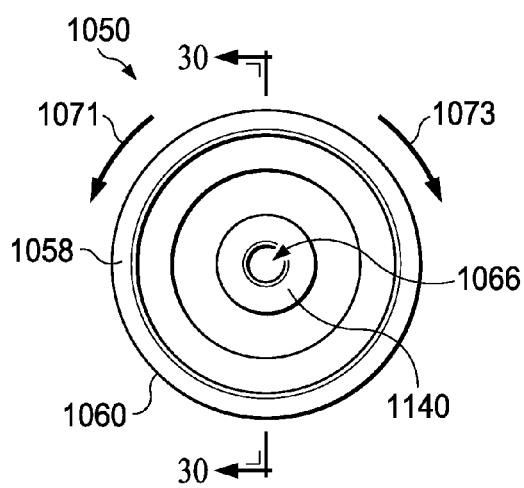
FIG. 28 is an upstream elevational view of the flow path insert of FIG. 26.
Figure 29:
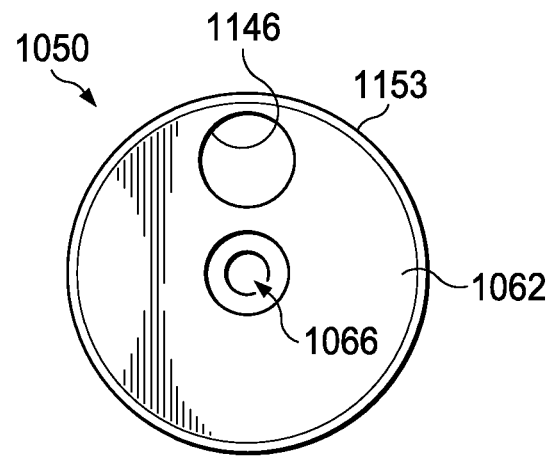
FIG. 29 is a downstream elevational of the flow path insert of FIG. 26.

The body 1012 can also define a cavity 1132 (FIGS. 24 and 25), which can be adjacent to, and in fluid communication with, the cavity 1126. The fluid control assembly 1010 can include a flow path insert 1050, according to another embodiment (FIGS. 26-30). The flow path insert 1050 can be positioned within the cavity 1132, and can be engaged with the body 1012. The fluid control assembly 1010 can also include a retainer 1136, which can also be positioned within the cavity 1132. The retainer 1136 can be positioned downstream of, and in contacting engagement with, the flow path insert 1050, as shown in FIGS. 24 and 25. The retainer 1136 can threadedly engage the body 1012, and can therefore facilitate preventing the flow path insert 1050 from translating relative to the body 1012.

As illustrated in FIGS. 26-30, the flow path insert 1050 can include an upstream portion 1054 and a downstream portion 1056, which can be integral with the upstream portion 1054. In one embodiment, the upstream portion 1054 and the downstream portion 1056 can be made as a unitary structure from an ignition-resistant material, which can be brass, or any other suitable ignition-resistant material, for example, bronze or copper, and can be formed using any suitable process such as CNC machining, cast molding, or the like. The upstream portion 1054 and the downstream portion 1056 can cooperate to define an inlet passage 1066, and an outlet passage 1068 in fluid communication with the inlet passage 1066. The inlet passage 1066 can be in selective fluid communication with the fluid inlet passage 1028 in response to rotation of the knob 1122.

Figure 30:
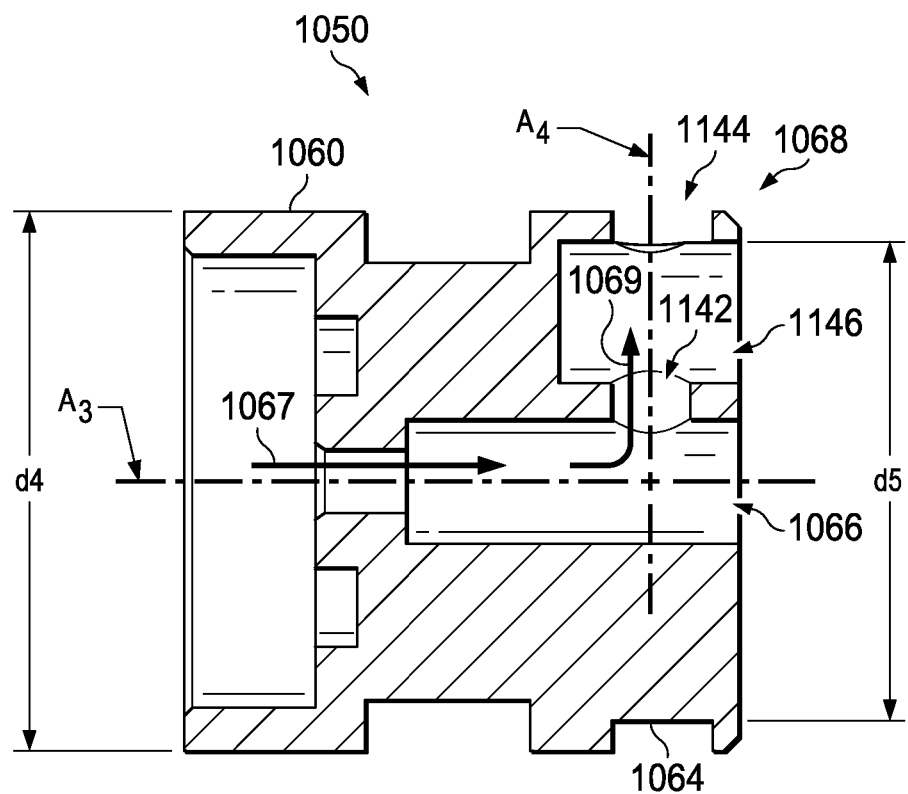
FIG. 30 is a cross-sectional view taken along line 30-30 in FIG. 28.
Figure 34:
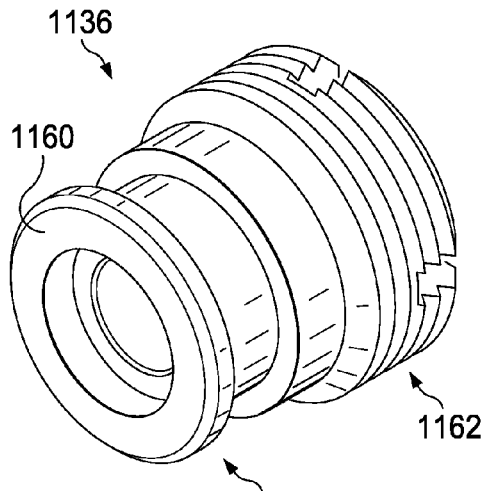
FIG. 34 is a top, upstream perspective view depicting a retainer according to one embodiment, of the fluid control assembly of FIG. 19.
Figure 35:
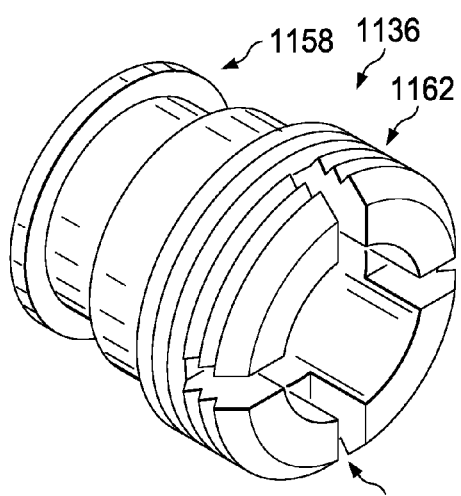
FIG. 35 is a top, downstream perspective view of the retainer of FIG. 34.
Figure 36:
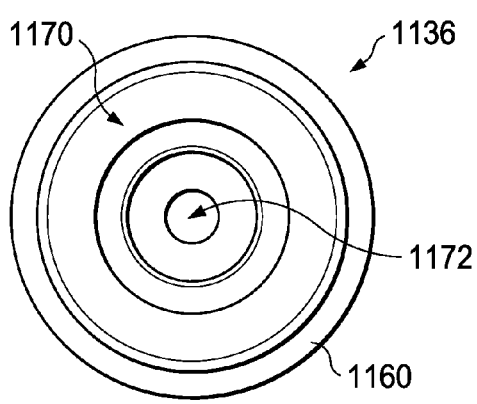
FIG. 36 is an upstream elevational view of the retainer of FIG. 34.
Figure 37:
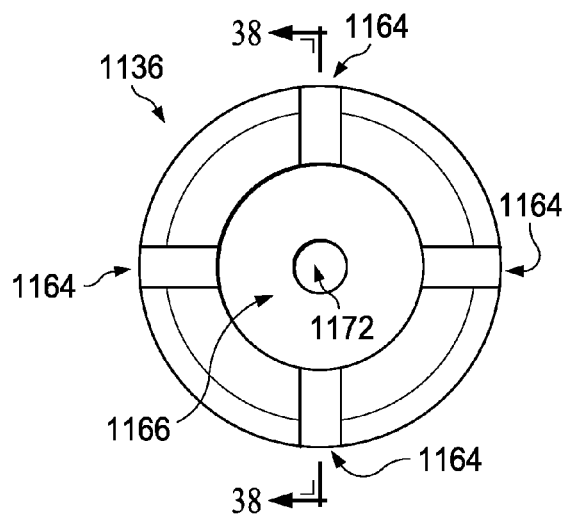
FIG. 37 is a downstream elevational view of the retainer of FIG. 34.
Figure 38:
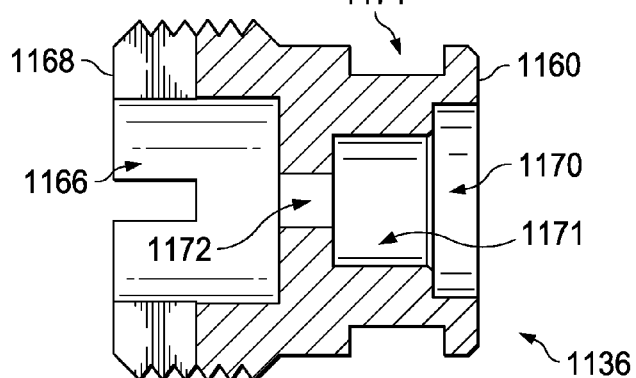
FIG. 38 is a cross-sectional view taken along line 38-38 in FIG. 37.

The upstream portion 1054 can include an upstream end surface 1058 and an upstream peripheral surface 1060. The downstream portion 1056 can include a downstream end surface 1062 and a downstream peripheral surface 1064. As illustrated in FIG. 30, the upstream peripheral surface 1060 has a diameter d4, and the downstream peripheral surface 1064 has a diameter d5. The diameter d4 can be greater than the diameter d5. The inlet passage 1066 can define a first axis $A_3$, and the outlet passage 1068 can define a second axis $A_4$. The second axis $A_4$ can be transverse to the first axis $A_3$. In one embodiment, the second axis $A_4$ can be perpendicular to the first axis $A_3$. In one embodiment, the inlet passage 1066 and the outlet passage 1068 can be routed through the flow path insert 1050 such that first axis $A_3$ can extend longitudinally and the second axis $A_4$ can extend radially. The upstream portion 1054 of the flow path insert 1050 can define a cavity 1138 and can further include a recessed surface 1140 which can be longitudinally spaced from the upstream end surface 1058. The inlet passage 1066 can extend through the recessed surface 1140 and can be in fluid communication with the cavity 1138. The outlet passage 1068 can extend through the downstream peripheral surface 1064.

The outlet passage 1068 can include a first discharge orifice 1142, a second discharge orifice 1144, and a cavity 1146, as shown in FIG. 30. The first discharge orifice 1142 can be in fluid communication with the inlet passage 1066. The cavity 1146 can be in fluid communication with each of the first discharge orifice 1142 and the second discharge orifice 1144. The second discharge orifice 1144 can extend through the downstream peripheral surface 1064. In one embodiment, the inlet passage 1066 can extend through the downstream end surface 1062. In one embodiment, the cavity 1146 can extend through the downstream end surface 1062, as shown in FIG. 30, and can receive a filter 1074 (FIG. 25). The downstream portion 1056 of the flow path insert 1050 can cooperate with the body 1012 to define an annular passage 1070 (FIG. 25) which can be in fluid communication with the outlet passage 1068 (e.g., via the second discharge orifice 1144).

The upstream portion 1054 of the flow path insert 1050 can include an upstream ring 1149, which can include the upstream peripheral surface 1060. The downstream portion 1056 can include a downstream ring 1151 and an annular flange 1153. The downstream peripheral surface 1064 can extend between the downstream ring 1151 and the annular flange 1153. In one embodiment, a diameter of a peripheral surface of the downstream ring 1151 and a diameter of a peripheral surface of the annular flange 1153 can be substantially the same as the diameter d4 of the upstream peripheral surface 1060 of the upstream ring 1149. In this embodiment, each of the upstream ring 1149, the downstream ring 1151, and the annular flange 1153 can engage the body 1012. The downstream ring 1151, the downstream peripheral surface 1064, and the annular flange 1153 can cooperate with the body 1012 to define the annular passage 1070. The upstream portion 1054 and the downstream portion 1056 can cooperate to define a channel 1155 that can be configured to receive one or more seal members, for example, two seal members 1226 as shown in FIG. 25. Each of the seal members 1226 can be an O-ring and can be in contacting engagement with the body 1012 to provide a seal between the flow path insert 1050 and the body 1012 at a position intermediate the upstream end surface 1058 and the downstream end surface 1062.

The configuration of the pressure regulator 1016 can be the same as, or similar to, the configuration of the pressure regulator 16 of the fluid control assembly 10, and can operably function the same as, or similar to, the pressure regulator 16. For example, the pressure regulator 1016 can be a piston-type regulator, although in other embodiments, diaphragm-type pressure regulators can be used in lieu of the pressure regulator 1016. In the illustrated embodiment, the pressure regulator can include a piston 1082. The pressure regulator 1016 can at least partially define a regulator chamber 1080, and can define a low pressure chamber 1089. As shown in FIG. 25, the pressure regulator 1016 can cooperate with the body 1012 to define the regulator chamber 1080. The body 1012 can define a regulator inlet orifice 1078 which can be in fluid communication with the annular passage 1070 and can be in at least intermittent fluid communication with the regulator chamber 1080. The body 1012 can include a regulator seat interface portion 1111. The regulator seat interface portion 1111 can define the regulator inlet orifice 1078, and can be a machined portion of the body 1012. In one embodiment, the regulator seat interface portion 1111 can have a frustoconical shape and can include a plateau 1113, which can be planar. The pressure regulator 1016 can include a regulator seat 1085, which can be formed from a polymeric material. The plateau 1113 can be positioned in a confronting relationship with the regulator seat 1085.

The fluid control assembly 1010 can include an auxiliary valve 1091 (FIG. 24) which can be integral with, and extend away from, a housing 1081 of the pressure regulator 1016. The auxiliary valve 1091 can be the same as, or similar to in many respects as the auxiliary valve 91. For example, the auxiliary valve 1091 can define an interior chamber 1219 which can be in selective fluid communication with the low pressure chamber 1089 by depressing a portion of the auxiliary valve 1091. Coupling of a pneumatic tool, or associated hose, to the auxiliary valve 1091 can facilitate depression of the portion of the auxiliary valve 1091 to facilitate use of the auxiliary valve 1091 as a "power takeoff" with pressurized fluid being supplied to operate pneumatic tool from the auxiliary valve 1091. In one embodiment, a cap 1221 can be releasably attached to the auxiliary valve 1091, when not in use, to prevent inadvertent actuation of the auxiliary valve 1091.

The inlet passage 1066, the outlet passage 1068, the annular passage 1070, and the regulator inlet orifice 1078 can each have a flow coefficient. The flow coefficient of each one of the inlet passage 1066, the outlet passage 1068 and the annular passage 1070 can be greater than the flow coefficient of the regulator inlet orifice 1078 to prevent a "choked flow" condition. This can avoid an associated, undesirable performance of the pressure regulator 1016.

Referring to FIGS. 24 and 34-38, the retainer 1136 can include an upstream portion 1158, which can include an upstream end surface 1160 that can be in contacting engagement with the flow path insert 1050. The retainer 1136 can also include a downstream portion 1162 which can include a plurality of external threads and can threadedly engage the body 1012 to secure the retainer 1136 to the body 1012. The downstream portion 1162 of the retainer 1136 can define a plurality of circumferentially spaced slots 1164, which can facilitate installing the retainer 1136 within the body 1012. The downstream portion 1162 of the retainer 1136 can also define a cavity 1166 which can extend through a downstream end surface 1168 and can be in fluid communication with the slots 1164. The upstream portion 1158 of the retainer 1136 can define a cavity 1170, which can extend through the upstream end surface 1160. Retainer 1136 can also define a cavity 1171 that can communicate with the cavity 1170, and a passage 1172 which can communicate with each of the cavities 1171 and 1166. The retainer 1136 can also define a channel 1174 which can be configured to receive one or more resilient seals 1228, which can be a pair of O-rings, as shown in FIG. 25.

The multi-function valve 1120 can operably function as both a shutoff valve, and as a control valve, and each function can be achieved in response to rotation of the knob 1122. For example, in response to rotation of the knob 1122, the inlet passage 1066 defined by the flow path insert 1050 can be selectively, fluidically uncoupled from the fluid inlet passage 1028. Also, the flow rate of the pressurized fluid discharging through the fluid outlet passage 1030 can be varied in response to rotation of the knob 1122.

Referring to FIGS. 24, 25 and 41, the multi-function valve 1120 can include a coupling member 1096 and an orifice plate 1095. A distal end of the coupling member 1096 can be integral with the orifice plate 1095, and a proximal end of the coupling member 1096 can be releasably secured to the knob 1122. For example, a fastener 1097, such as a nut, can engage threads formed on the coupling member 1096 such that the coupling member 1096 and the orifice plate 1095 can rotate together with the knob 1122. The multi-function valve 1120 can also include a guide 1098 which can be positioned within a cavity 1099 that can be defined by the body 1012. As shown in FIG. 41, a portion of the coupling member 1096 can extend through a passage 1100 defined by the guide 1098.

The multi-function valve 1120 can also include a splined member 1176 which can be integral with the orifice plate 1095. In one embodiment, the splined member 1176, the orifice plate 1095, and the coupling member 1096 can be integrally made as a unitary structure. The multi-function valve 1120 can also include a driver 1178 which can include a plurality of internal splines. The splined member 1176 can include a plurality of external splines which can mesh with the internal splines of the driver 1178. A first portion 1180 of the driver 1178 can be positioned within a cavity 1182 defined by the body 1012 and can threadedly engage the body 1012, as shown in FIG. 25. A second portion 1184 of the driver 1178 can extend away from the first portion 1180 and can protrude into the cavity 1166 defined by the retainer 1136. The splined member 1176 and the driver 1178 can rotate together with the orifice plate 1095 and the knob 1122. Rotation of the driver 1178 can result in translation of the driver 1178 relative to the body 1012.

As illustrated in FIG. 31, the multi-function valve 1120 can also include a valve stem 1186 which can include a proximal portion 1188, a distal portion 1190, and an intermediate portion 1192 engaged with each of the proximal portion 1188 and the distal portion 1190. In one embodiment, the proximal portion 1188, distal portion 1190, and intermediate portion 1192 can be made as a unitary structure. In one embodiment, as shown in FIG. 31, each of the proximal portion 1188 and the distal portion 1190 can be cylindrical, and the proximal portion 1188 can have a relatively larger outside diameter. The intermediate portion 1192 can have a generally triangular cross-sectional shape, and can define a plurality of circumferentially spaced lobes 1194 that can protrude radially outwardly beyond the proximal portion 1188. A proximal end of the proximal portion 1188 can define a recess 1196 that can be configured to receive a spherical member 1198 (FIG. 25) which can be secured to the driver 1178 in a cavity 1200 that can be defined by the second portion 1184 of the driver 1178.

The multi-function valve 1120 can also include a valve seat 1202 (FIG. 25) and a valve structure 1204. The valve structure 1204 can be translatable relative to the valve seat 1202 in response to rotation of the knob 1122. The valve seat 1202 can be positioned within the recess 1138 defined by the flow path insert 1050 and can be secured to the flow path insert 1050, for example, as a result of an interference fit. In one embodiment, the valve seat 1202 can be formed from a polymeric material. At least a portion of the valve structure 1204 can be positioned within the cavity 1126 defined by the body 1012.

Figure 47:
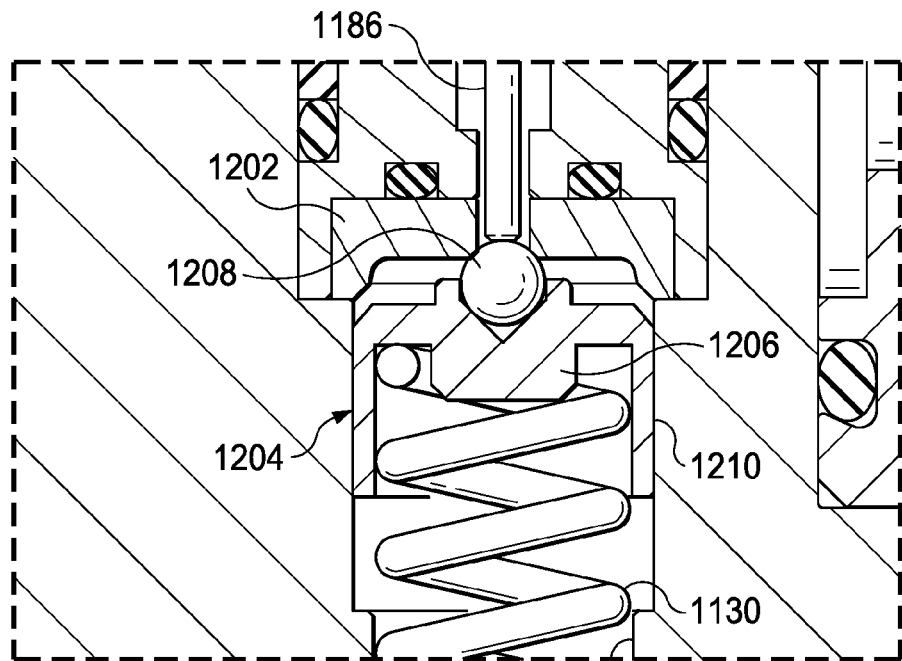
FIG. 47 is an enlarged view of an encircled portion of FIG. 24, with a valve structure of the fluid control assembly of FIG. 19 in contacting engagement with a valve seat of the fluid control assembly of FIG. 19, in a closed position.
Figure 48:
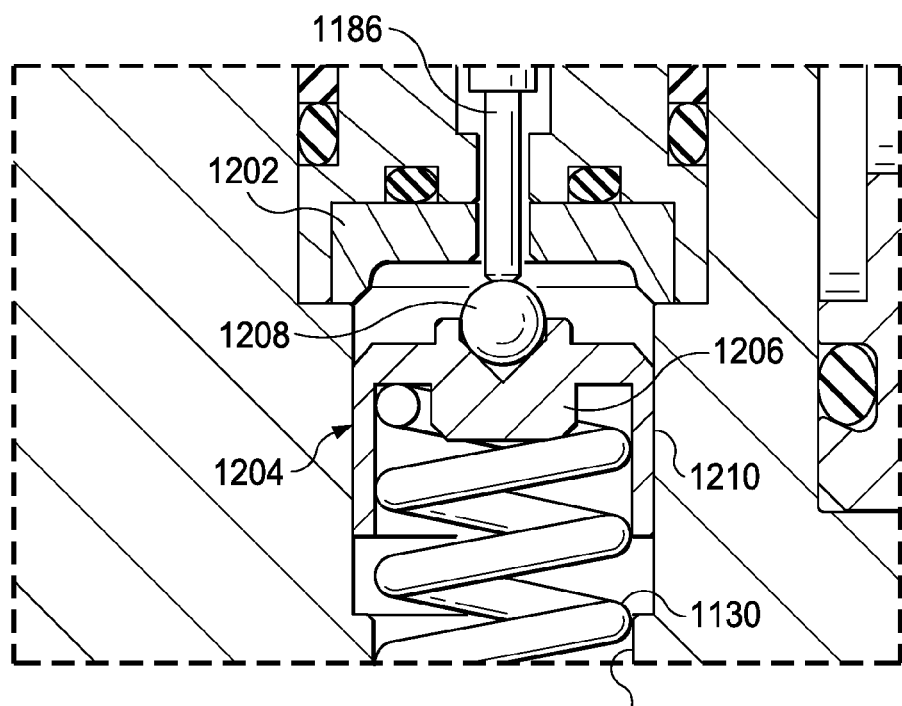
FIG. 48 is an enlarged view similar to FIG. 47, but with the valve structure being depicted spaced apart from the valve seat in an open position.

The valve structure 1204 can include a support member 1206 and a contact member 1208 which can be a spherical member and can be secured to the support member 1206. The support member 1206 can define a hollow interior and can include a peripheral wall 1210. The peripheral wall 1210 can have a polygonal shape. In one embodiment, the peripheral wall 1210 can have a hexagonal shape. As shown in FIG. 25, the biasing member 1130 can be in contacting engagement with the valve structure 1204 and with the body 1012 and can bias the valve structure 1204 toward the valve seat 1202 and into a closed position. FIGS. 24, 25 and 47 illustrate the valve structure 1204 in a closed position, i.e., with the valve structure 1204 in contacting engagement with the valve seat 1202. FIG. 48 illustrates the valve structure 1204 in an open position and spaced from the valve seat 1202.

Referring to FIGS. 24 and 25, the valve stem 1186 can extend through the retainer 1136 and the flow path insert 1050. In one embodiment, the valve stem 1186 can extend through the cavity 1166, the passage 1172, and the cavities 1171 and 1170, defined by the retainer 1136, and can extend through the inlet passage 1066 defined by the flow path insert 1050. The valve stem 1186 can be coupled with the driver 1178 as a result of the contacting engagement of the spherical member 1198 and the recess 1196 defined by the proximal portion 1188 of the valve stem 1186. In other embodiments, a valve stem can be coupled with a driver in any other suitable structural configuration. The distal end 1190 of the valve stem 1186 can extend into the valve seat 1202 and into contacting engagement with the contact member 1208 of the valve structure 1204.

The fluid control assembly 1010 can include a washer 1220, which can be positioned within the cavity 1170 defined by the upstream portion 1158 of retainer 1136 and can provide stability with regard to the radial positioning of the valve stem 1186 within the retainer 1136 and the flow path insert 1050. The washer 1220 can be made from any suitable ignition-resistant material, such as brass. The fluid control assembly 1010 can also include a resilient seal 1222 and a back-up washer 1224, which can each be positioned within the cavity 1171 defined by the retainer 1136. The resilient seal 1222 can be an O-ring made from an elastomeric material and can be positioned between, and in contacting engagement with, each one of the washer 1220 and the washer 1224. The washer 1224 can be formed from a polymeric material.

In operation, rotation of the knob 1122 in a first direction, which can be clockwise (as viewed from the top of the fluid control assembly 1010) in one embodiment, can cause the driver 1178 and valve stem 1186 to translate so that the valve stem 1186 forces the valve structure 1204 away from the valve seat 1202 against a biasing force of the biasing member 1130 which permits pressurized fluid from a source of pressurized fluid to flow through the fluid inlet passage 1028 into the cavity 1126 and past the biasing member 1130.

Figure 39:
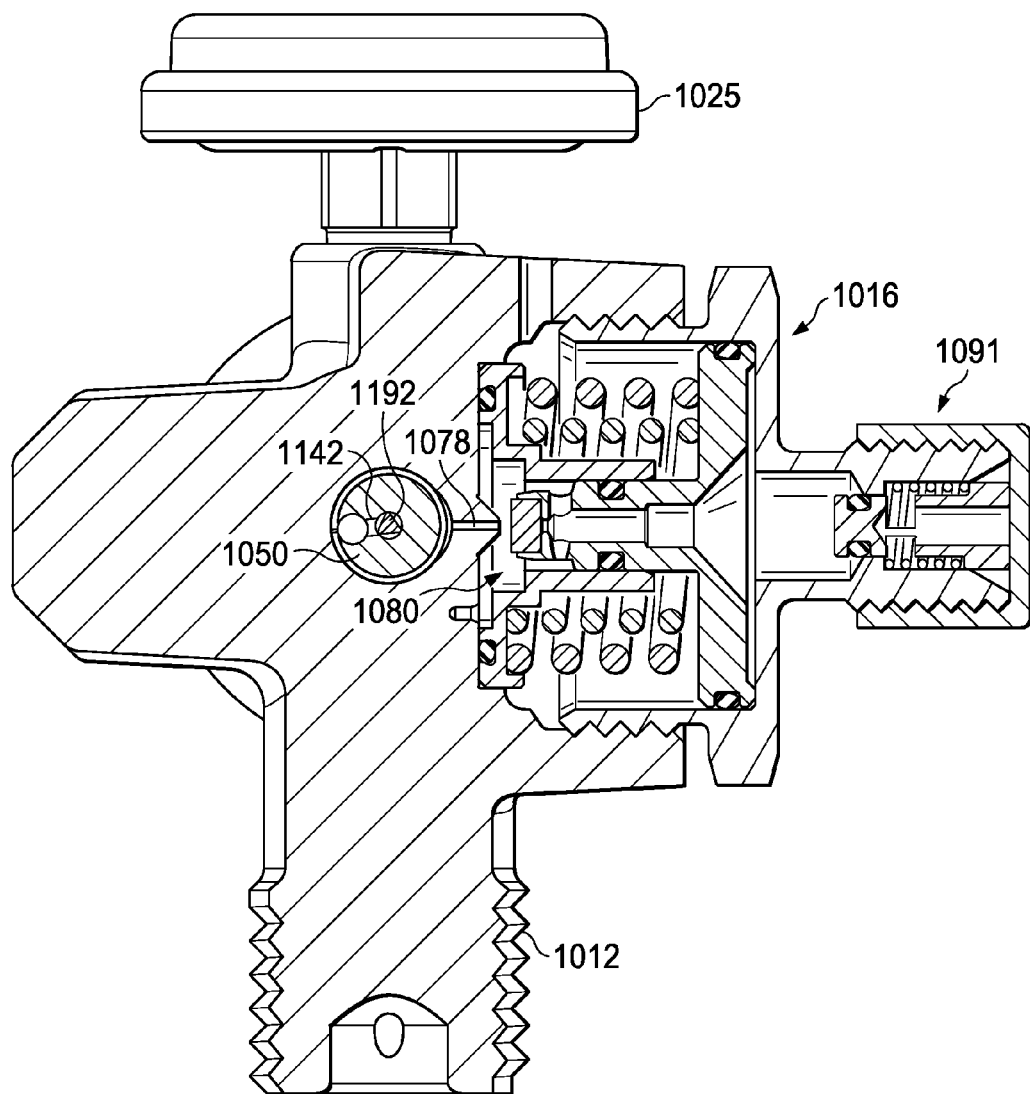
FIG. 39 is cross-sectional view taken along line 39-39 in FIG. 20.

Referring to FIG. 39, the lobes 1194 defined by the intermediate portion 1192 of the valve stem 1186 can be sized so that they contact an inner surface of the flow path insert 1050 that defines the inlet passage 1066. This can center the valve stem 1186 within the inlet passage 1066 which can facilitate contacting of the contact member 1208 of the valve structure 1204 with the valve stem 1186 in a desired orientation. Due to the polygonal shape of the peripheral wall 1210 of the valve structure 1204, which can be hexagonal, the peripheral wall 1210 can contact the body 1012 at one or more locations corresponding to the vertices of the polygonal shape. The peripheral wall 1210 can be otherwise spaced from the body 1012. When the valve structure 1204 is spaced from the valve seat 1202 (i.e., in the open position), the pressurized fluid can flow through the spaces where the peripheral wall 1210 is spaced from the body 1012 and can then flow around the contact member 1208 and into an annular space between the valve stem 1186 and the valve seat 1202.

The pressurized fluid is then forced to follow a tortuous flow path as it flows into and through the flow path insert 1050. For example, the pressurized fluid flows into the inlet passage 1066 defined by the flow path 1050 along axis $A_3$, as indicated by flow arrow 1067 in FIG. 30. Although the inlet passage 1066 can extend through the flow path insert 1050, as shown in FIG. 30, the pressurized fluid is forced to turn into the outlet passage 1068, as indicated by flow arrow 1069 in FIG. 30, due to the presence of the washer 1220, the resilient seal 1222, and the back-up washer 1224 positioned within the retainer 1136. In one embodiment, the pressurized fluid is forced to turn about 90 degrees from the inlet passage 1066 into the outlet passage 1068. The lobes 1194 of the valve stem 1186, and the first discharge orifice 1142 of the outlet passage 1068 can be sized so that the first discharge orifice 1142 is not occluded if one of the lobes 1194 is aligned with the first discharge orifice 1142. Additionally, the lobes 1194 and the first discharge orifice 1142 can be sized so that an unobstructed portion of the first discharge orifice 1142 has a sufficient flow coefficient.

Pressurized air discharging from the outlet passage 1068 flows into the annular passage 1070. The location where the second discharge orifice 1142 extends through the downstream peripheral surface 1064 of the flow path insert 1050 can be circumferentially spaced from the location where the regulator inlet orifice 1078 communicates with the annular passage 1070. In one embodiment, this circumferential spacing can be about 180 degrees. As a result, the pressurized fluid can flow in both counterclockwise and clockwise directions through the annular space 1070, around the downstream peripheral surface 1064, as indicated by flow arrows 1071 and 1073 in FIG. 28. The pressurized fluid can then flow into and through the regulator inlet orifice 1078 to the regulator chamber 1080. The transition from relatively high pressure fluid, to relatively low pressure fluid, can occur at the interface between the regulator inlet orifice 1078 and the regulator seat 1085 of the pressure regulator 1016. The pressure regulator 1016 can function in the same or a similar manner as that described with respect to pressure regulator 16, such that low pressure fluid, which can be regulated to a predetermined pressure, can discharge from the regulator chamber 1080 into the regulator discharge passage 1092 and can flow through the regulator discharge passage 1092, as indicated by flow arrow 1109 (FIG. 40), to a flow control inlet chamber 1093 (FIG. 41), which can be defined in part by the orifice plate 1095 of the multi-function valve 1120.

Figure 40:
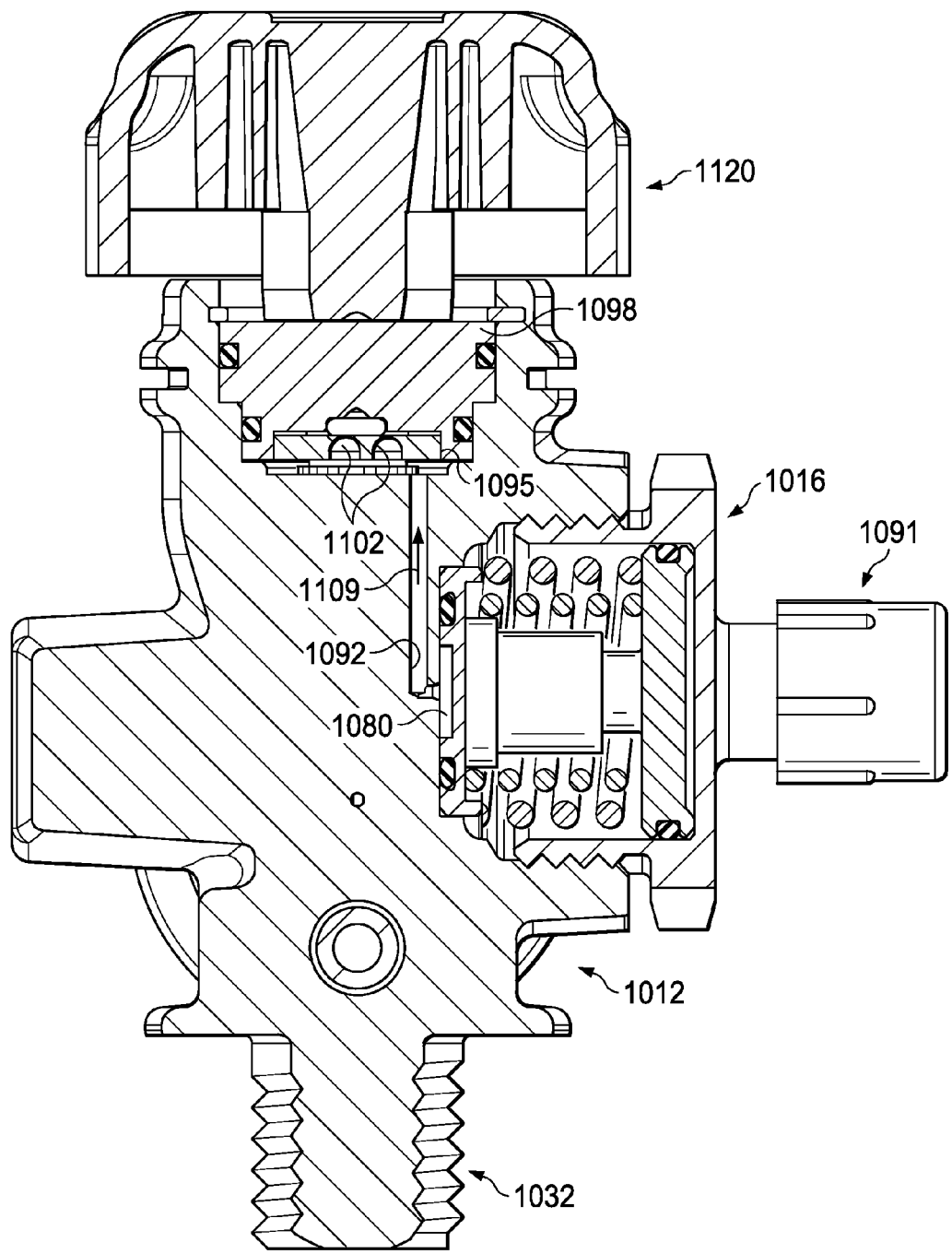
FIG. 40 is a cross-sectional view taken along line 40-40 in FIG. 22.

The orifice plate 1095 can be configured the same as, or similar to, the orifice plate 95 of fluid control assembly 10, and can define a plurality of circumferentially spaced recessed areas 1102, or counterbores (two shown in FIG. 40). The orifice plate 1095 can also define a plurality of orifices (not shown), which can be configured the same as, or similar to, orifices 95. Each orifice can be positioned in a respective one of the recessed areas 1102, and can be in selective fluid communication with the flow control inlet chamber 1093 (FIG. 41). In one embodiment, the number of orifices can be one less than the number of recessed areas 1102, such that one of the recessed areas 1102 is devoid of an orifice. In one embodiment, the orifice plate 1095 can include twelve of the recessed areas 1102, which can be equally spaced circumferentially, and can define eleven of the orifices.

Figure 20:
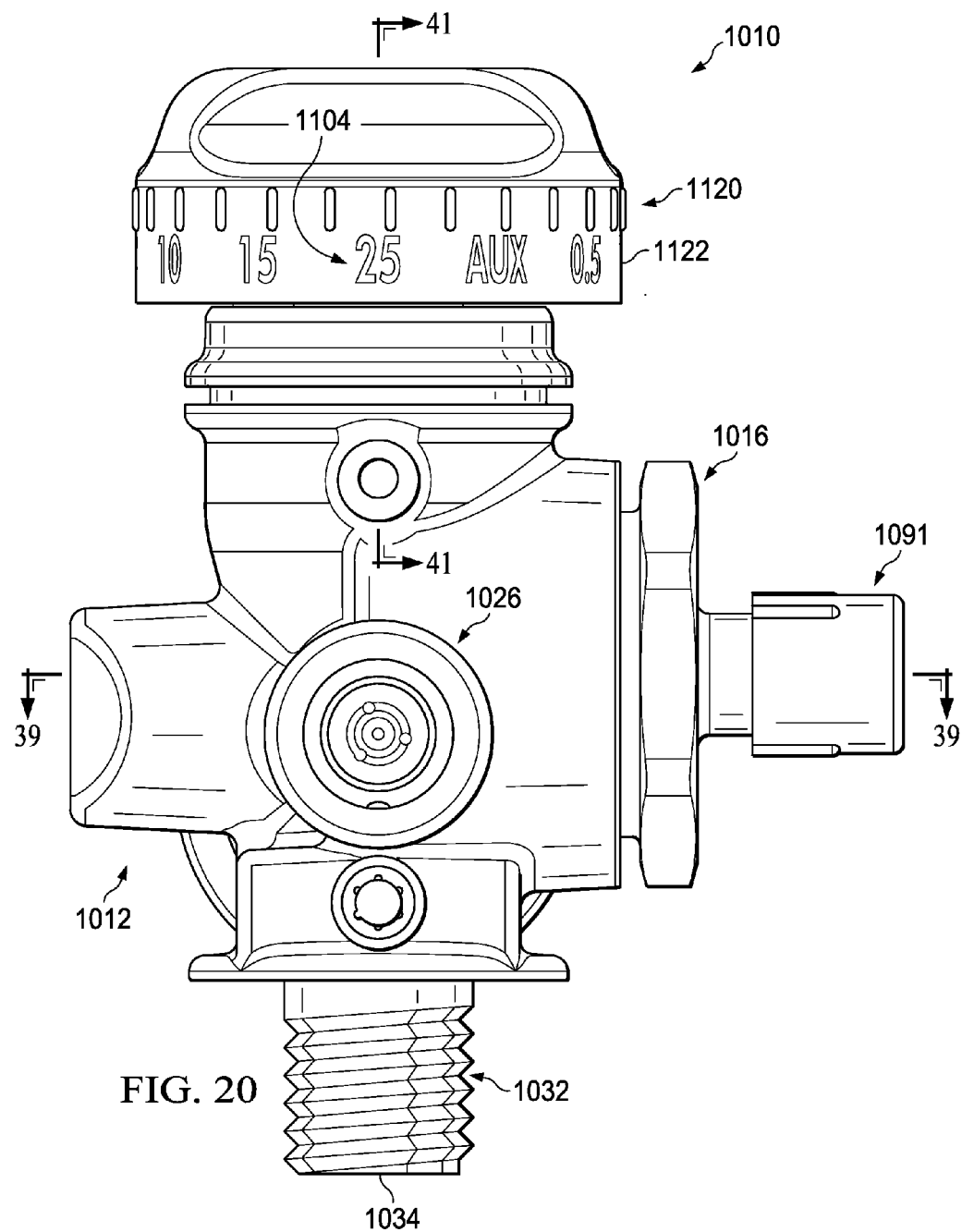
FIG. 20 is a left side elevational view of the fluid control assembly of FIG. 19.
Figure 21:
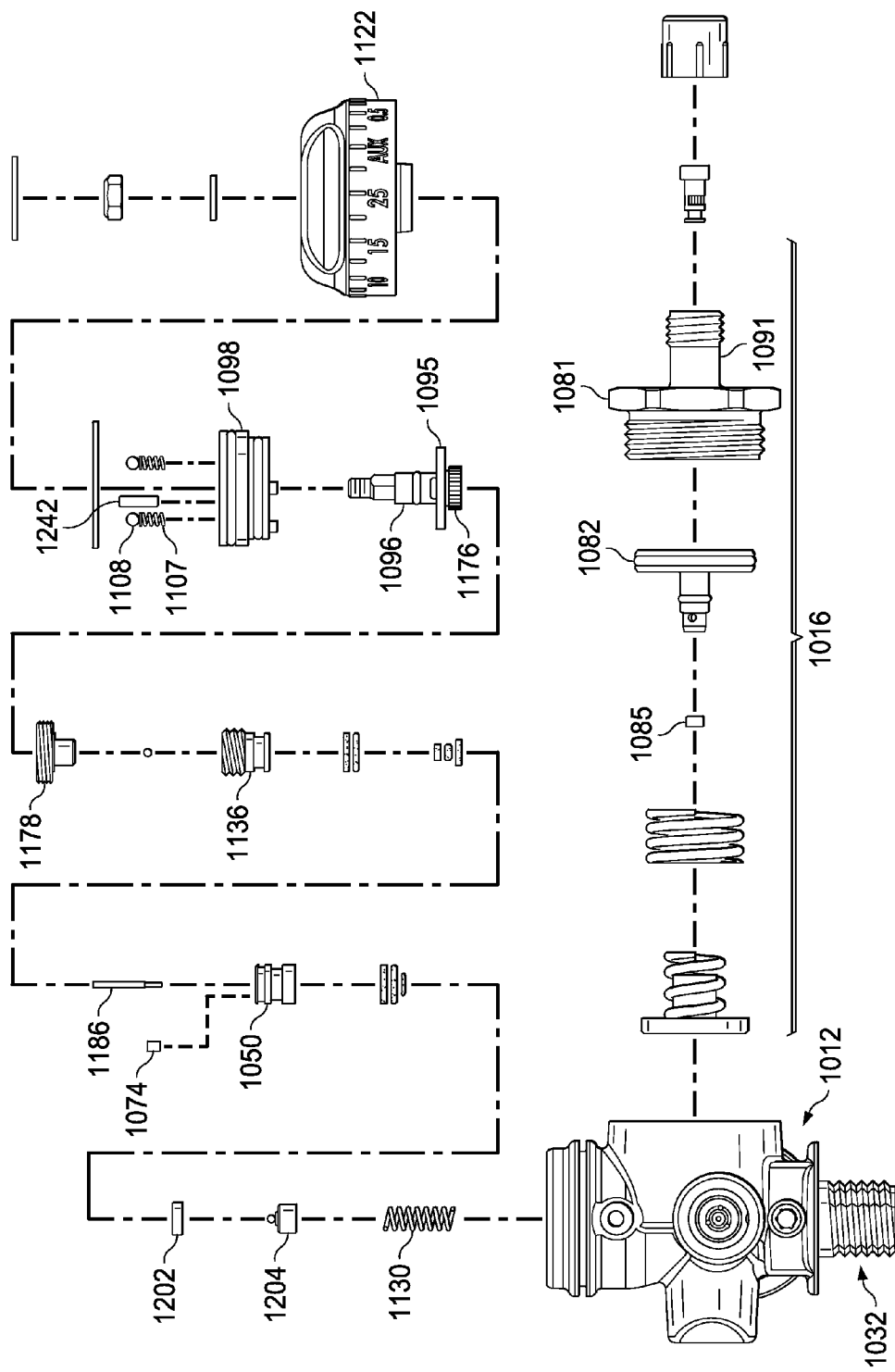
FIG. 21 is an exploded perspective view of the fluid control assembly of FIG. 19, with the fluid control assembly oriented as shown in FIG. 20.
Figure 22:
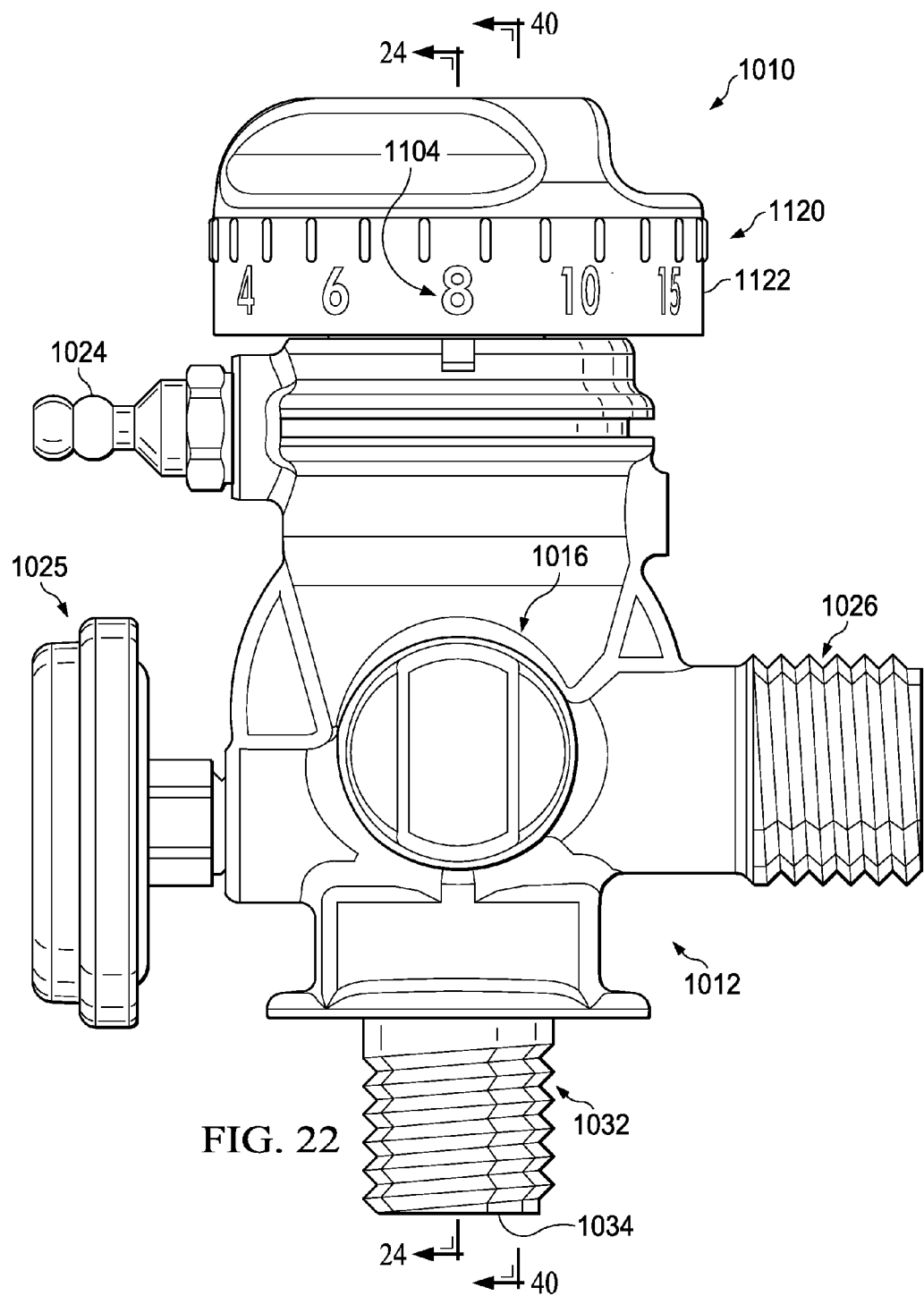
FIG. 22 is a front elevational view of the fluid control assembly of FIG. 19.
Figure 23:
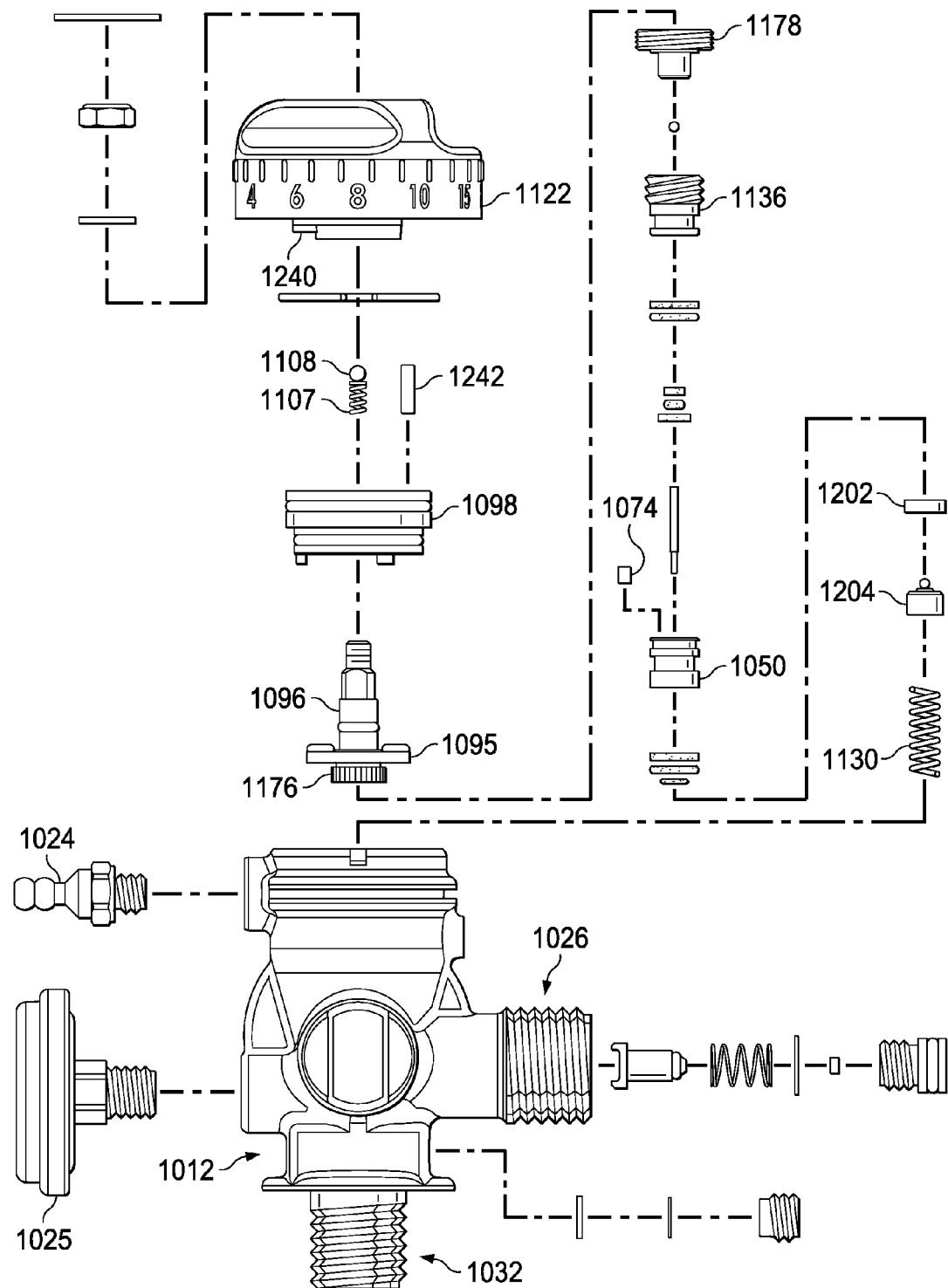
FIG. 23 is an exploded perspective view of the fluid control assembly of FIG. 19, with the fluid control assembly oriented as shown in FIG. 22.

The knob 1122 of the multi-function valve 1120 can include a plurality of circumferentially spaced indicia, indicated generally at 1104 in FIG. 20. Each of the indicia 1104 can correspond to a flow rate of fluid discharging through the fluid outlet passage 1030 in any desired unit of flow rate. When a user desires to discharge pressurized fluid through the fluid outlet passage 1030, the user can rotate the knob 1122, which also rotates the orifice plate 1095, until a respective one of the orifices is aligned with a flow control outlet passage 1105 (FIG. 41) which can be defined by the guide 1098. An indicator (not shown) can be provided so that a desired flow rate can be achieved when the corresponding indicia 1104 are aligned with the indicator. The fluid control assembly 1010 can be calibrated to provide correspondence between each indicated flow rate and the alignment of the flow control outlet passage 1105 with the respective one of the orifices that is required to achieve the indicated flow rate. When a "no flow" condition is desired, a user can rotate the knob 1122 as required to align the recessed area that does not include an orifice with the flow control outlet passage 1105, such that the flow control outlet passage 1105 and the flow control inlet chamber 1093 are fluidically uncoupled. The flow control outlet passage 1105 can be in fluid communication with the fluid outlet passage 1030 which can be in fluid communication with the interior passage (not shown) defined by the outlet barb 1024. This can permit pressurized fluid to flow through the outlet barb 1024 to a flow passage defined by a cannula (not shown) of a fluid delivery system.

The knob 1122 of the multi-function valve 1120 can include a plurality of circumferentially spaced indentations 1244 (FIG. 41). The guide 1098 can define a plurality of circumferentially spaced cavities which can have a like number as the indentations 1244 formed in the knob 1122. The flow control assembly 1010 can also include a plurality of biasing members 1107 which can be coil springs as shown in FIG. 24. Each of the biasing members 1107 can be positioned within a respective one of the cavities defined by the guide 1098. The fluid control assembly 1010 can also include a plurality of contact members 1108, which can be spherical balls. Each of the contact members 1108 can be positioned in contacting engagement with a respective one of the biasing members 1107. There can be an equal number of contact members 1108 and indentations 1244 formed in the knob 1122 of the multi-function valve 1120. Each of the biasing members 1107 can bias the corresponding contact member 1108 toward the knob 1122. Each of the contact members 1108 can engage one of the indentations 1244 formed in the knob 1122 of the multi-function valve 1120 which can facilitate maintaining the knob 1122 in a desired position for a particular flow rate.

The fluid control assembly 1010 can be configured to limit the rotation of the knob 1122. In one embodiment, the knob 1122 can include a shoulder 1240 (FIGS. 23 and 41) that can contact a roll pin 1242 (FIG. 23), which can be secured to the guide 1098, after a predetermined rotation of the knob 1122. In one embodiment, the knob 1122 can be limited to about 355 degrees of rotation. In other embodiments, any suitable configuration of anti-rotation features can be provided to limit the rotation of a knob.

Figure 42:
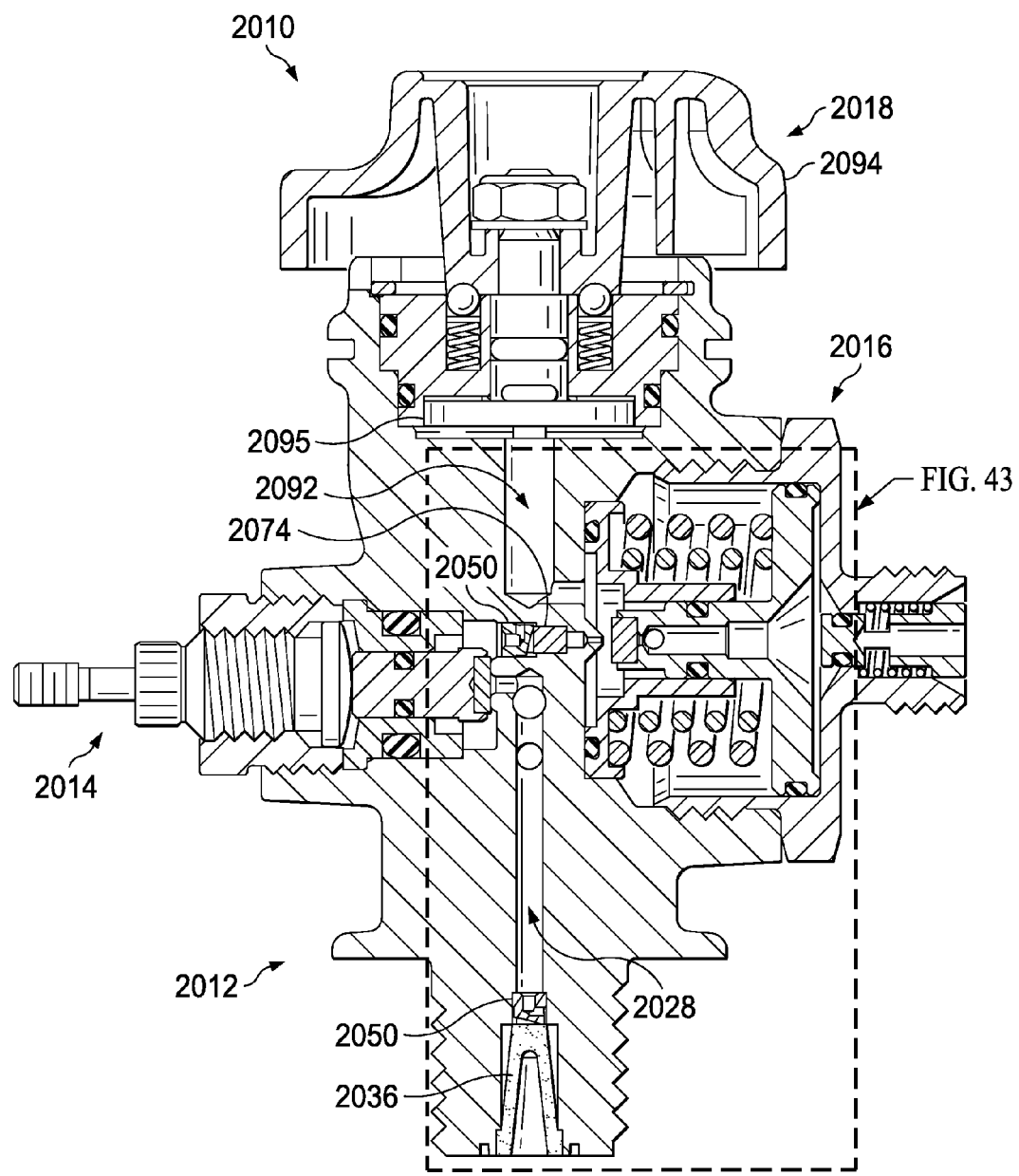
FIG. 42 is a cross-sectional view depicting a fluid control assembly according to yet another embodiment.
Figure 43:
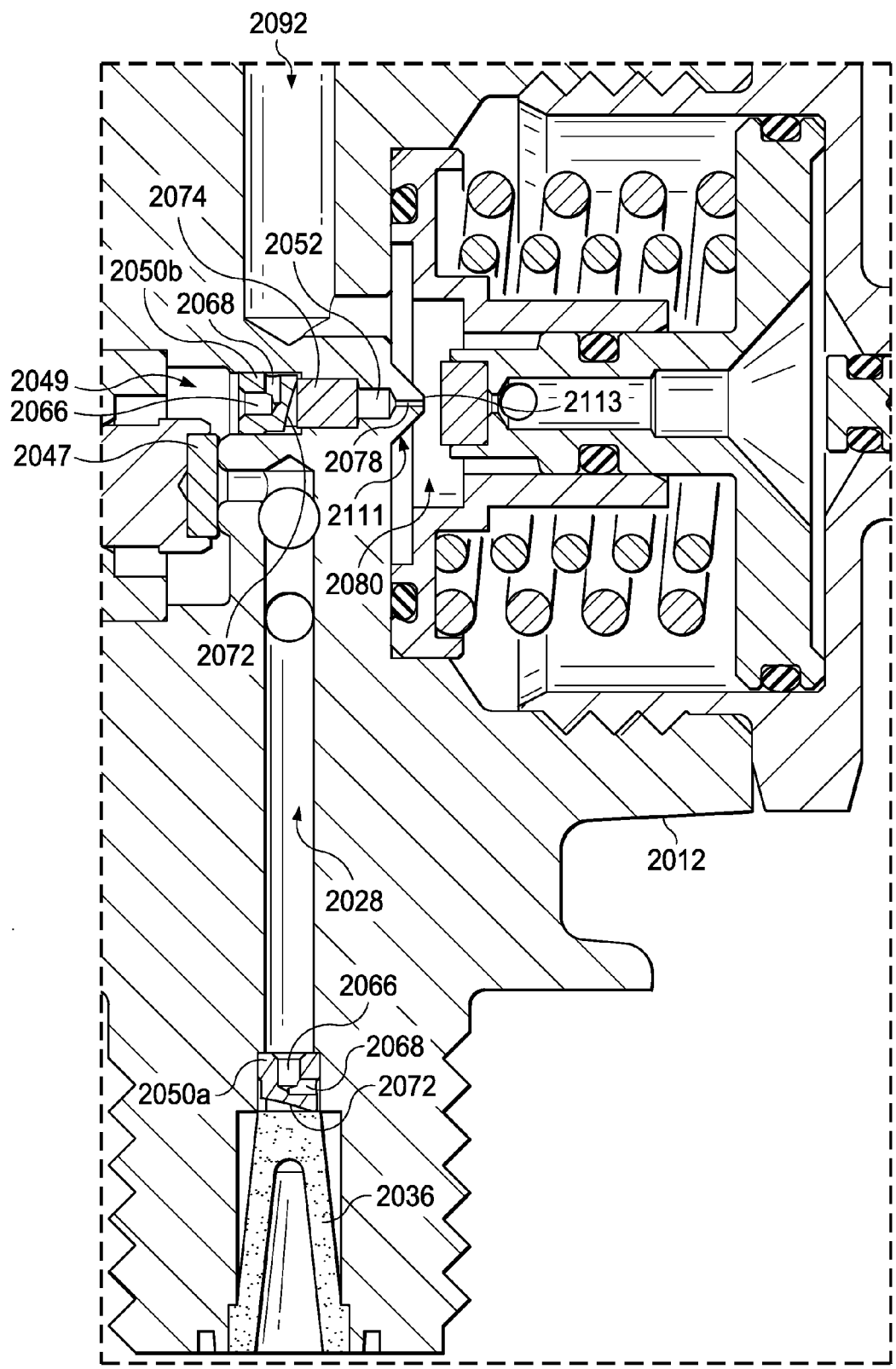
FIG. 43 is an enlarged view of an encircled portion of FIG. 42.

In other embodiments, fluid control assemblies can include a plurality of flow path inserts, which can be positioned at various locations within the fluid control assembly. For example, FIGS. 42 and 43 illustrate a fluid control assembly 2010 according to another embodiment, which can include two flow path inserts 2050 (FIG. 42). The fluid control assembly 2010 can otherwise be the same as, or similar to, the fluid control assembly 10. For example, the fluid control assembly 2010 can include a body 2012, and can include an isolation valve 2014, a pressure regulator 2016, and a control valve 2018, which each can be coupled with the body 2012. The control valve 2018 can include a knob 2094 and an orifice plate 2095 which can rotate together with the knob 2094.

The body 2012 can define a fluid inlet passage 2028 and a fluid outlet passage (not shown). The isolation valve 2014 can define an isolation valve chamber 2049 (FIG. 43) which can be in selective fluid communication with the fluid inlet passage 2028. For example, a seat 2047 of the isolation valve 2014, which can be formed from a polymeric material, can be movable between an open position and a closed position. In the open position, the fluid inlet passage 2028 can be in fluid communication with the isolation valve chamber 2049. The fluid inlet passage 2028 can be fluidically uncoupled from the isolation valve chamber 2049 when the seat 2047 is in a closed position. The body 2012 can also define an isolation valve discharge passage 2052, which can be in fluid communication with the isolation valve chamber 2049. The pressure regulator 2016 can at least partially define a regulator chamber 2080. As shown in FIG. 43, the pressure regulator 2016 can cooperate with the body 2012 to define the regulator chamber 2080. The body 2012 can further define a regulator inlet orifice 2078, which can be in fluid communication with the isolation valve discharge passage 2052, and can be in at least intermittent fluid communication with the regulator chamber 2080. Body 2012 can also define a regulator discharge passage 2092, which can be in fluid communication with the regulator chamber 2080.

The body 2012 can include a regulator seat interface portion 2111. The regulator seat interface portion 2111 can define the regulator inlet orifice 2078, and can be a machined portion of the body 2012. In one embodiment, the regulator seat interface portion can have a frustoconical shape and can include a plateau 2113, which can be planar. The pressure regulator 2016 can include a regulator seat, which can be formed from a polymeric material. The plateau 2113 can be positioned in a confronting relationship with the regulator seat.

Each of the flow path inserts 2050 can be configured the same as, or similar to, the flow path insert 50 of the fluid control assembly 10. For example, each of the flow path inserts 2050 can define a first passage 2066 and a second passage 2068 in fluid communication with the first passage 2066. Also, each of the flow path inserts 2050 can cooperate with at least the body 2012 to define an annular passage (not numbered), and each of the flow path inserts can include an inclined surface 2072.

A first one of the flow path inserts, designated 2050a in FIG. 43, can be positioned within the fluid inlet passage 2028, adjacent to, and downstream of, a filter 2036, and upstream of the isolation valve 2014. A second one of the flow path inserts, designated 2050b in FIG. 43, can be positioned within the isolation valve discharge passage 2052 (FIG. 43), downstream of the isolation valve 2014 and upstream of the pressure regulator 2016. A flow path component 2074, which can be a filter in one embodiment, but can be any one of a variety of other flow path components in other embodiments, can be positioned downstream of, and in contacting engagement with, the second one of the flow path inserts 2050. The flow path inserts 2050a and 2050b can have different orientations as shown in FIGS. 42 and 43. For example, the flow path insert 2050a can be oriented such that the first passage 2066 is an outlet passage and the second passage 2068 is an inlet passage, and the flow path insert 2050b can be oriented such that the first passage 2066 is an inlet passage and the second passage 2068 is an outlet passage.

Pressurized fluid that flows into the fluid inlet passage 2028, from a source of pressurized fluid, is forced to follow a tortuous flow path as the pressurized fluid flows through the flow path insert 2050a. Similarly, pressurized fluid discharging from the isolation valve chamber 2049 into the isolation valve discharge passage 2052 is forced to follow a tortuous flow path as it flows through the flow path insert 2050b.

Figure 44:
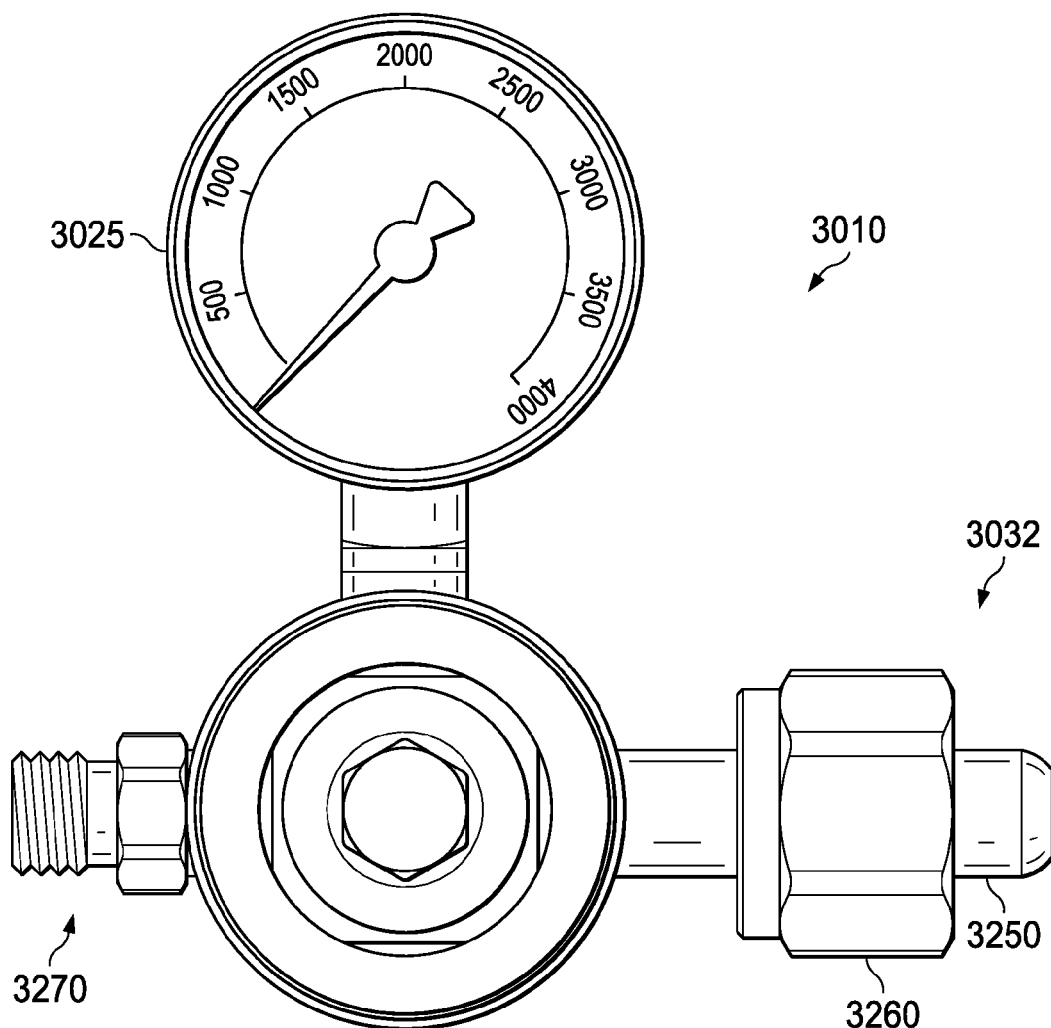
FIG. 44 is a perspective view depicting a fluid control assembly according to yet another embodiment.

FIGS. 44-46 illustrate a fluid control assembly 3010 according to another embodiment. The fluid control assembly 3010 can include a fluid inlet port 3032. The fluid inlet port 3032 can include a nipple 3250 and an associated coupling nut 3260, which can be configured for releasable attachment to a source of pressurized fluid, for example, a tank of pressurized gas. The nipple 3250 can define a fluid inlet passage 3028. The fluid control assembly 3010 can include a flow path insert 3050 (FIG. 46), which can be positioned within the fluid inlet passage 3028. The flow path insert 3050 can be configured the same as, or similar to, the flow path insert 50. Accordingly, the flow path insert 3050 can define an inlet passage, which can be in selective fluid communication with the source of pressurized fluid that is connected to nipple 3250. The flow path insert can also define an outlet passage in fluid communication with the inlet passage. The flow path insert 3050 and the nipple 3250 can cooperate to define an annular passage, which can be in fluid communication with the outlet passage.

Due to the configuration of the flow path insert 3050, pressurized fluid can be forced to follow a tortuous flow path as it flows through the flow path insert 3050. Pressurized fluid discharging from the annular passage can flow along an inclined surface and into the fluid inlet passage 3028, and to a pressure regulator assembly 3016, as indicated by flow arrow 3029. A pressure gauge 3025 can provide an indication of the pressure of the fluid within a pressure regulator assembly 3016. The pressurized fluid can discharge from the pressure regulator assembly 3016 into an outlet passage 3030 defined by an outlet port 3270 that can be coupled with the pressure regulator assembly 3016.

The use of a flow path insert (e.g., 50, 150, 250, 1050, 2050, and 3050) in fluid control assemblies (e.g., 10, 1010, 2010, and 3010) can result in various advantages. It will be appreciated that the use of flow path inserts having respective configurations other than those configurations disclosed herein can also result in various advantages. These advantages can include ensuring, or at least substantially ensuring, ignition inhibition during the detonation period of an oxidizer-related auto-ignition that occurs upstream of the flow path component. Also, the flow path components can prevent, or at least substantially prevent, an oxidizer-related auto-ignition associated with a downstream component.

The flow path components can be configured so that a pressurized fluid is forced to follow a tortuous flow path as it flows through the flow path insert. This tortuous flow path can effectively reduce the kinetic energy of the pressurized fluid, such that a flame produced by an auto-ignition event can be extinguished. The flow path inserts can be made from an ignition-resistant material, which can enhance the ability to extinguish a flame of an auto-ignition event associated with an upstream component, and can enhance the ability to prevent an auto-ignition event associated with a downstream component.

Additionally, flow path inserts can be used to retain one or more flow path components (e.g., 74, 1074), which can be filters, restrictors, or other flow path components. In one embodiment, this can be achieved as a result of positioning the flow path insert adjacent the flow path component (e.g., 50, 74). In other embodiments, the flow path component can be configured to receive and retain the flow path components (e.g., 1050, 1074).

These advantages of the flow path inserts can be achieved without impeding the flow of pressurized fluid through the associated fluid control assembly, as a result of the sizes and configurations of the passages defined by the flow path inserts, or the passages defined by the flow path insert in cooperation with other components, such as the body of the associated fluid control assemblies. For example, the flow coefficient of each of these passages (e.g., passages 66, 68, 70 and 76 of fluid control assembly 10; and passages 1066, 1068 and 1070 of fluid control assembly 1010) can be greater than the flow coefficient of the regulator inlet orifice (e.g., 78, 1078) which can be in fluid communication with the regulator chamber (e.g., 80, 1080) of the associated fluid control assembly (e.g., 10, 1010).

Also, multiple flow path inserts (e.g., 2050) can be used in a fluid control assembly (e.g., 2010) and can be positioned in various locations within the fluid control assembly. Additionally, flow path inserts can be used as part of fluid control assemblies (e.g., 10, 1010, 2010, and 3010) having a variety of configurations.

The use of a multi-function valve (e.g., 1120) in a fluid control assembly (e.g., 1010) can also result in various advantages. For example, the multi-function valve (e.g., 1120) can function as both a shutoff valve, to prevent the flow of pressurized fluid through the fluid control assembly (e.g., 1010), and to control a flow rate of pressurized fluid through the fluid control assembly (e.g., 1010). Both of these functions can be achieved in response to rotation of a single knob (e.g., 1122), which can be convenient for a user as compared to systems including separate shutoff and control valves, requiring a user to rotate two separate knobs.

The configuration of the multi-function valve (e.g., 1120) can eliminate, or at least substantially eliminate, problems associated with the valve seats of some known shutoff valves, which can occur as a result of over-torquing the associated knob of the shutoff valve, when closing the shutoff valve. This can result in forcing the valve seat, typically formed from a polymeric material, against a hard surface of the valve with excessive force. This can cause plastic deformation of the valve seat, preventing the valve from closing completely, and causing undesirable leakage to occur.

In contrast, the multi-function valve (e.g., 1120) can be normally closed, so that a user is not required to close the multi-function valve (e.g., 1120). Instead, rotating a knob (e.g., 1122) of the multi-function valve (e.g., 1120) can open the valve by moving a valve structure (e.g., 1204) away from a valve seat (e.g., 1202). A biasing member (e.g., 1130), which can be a coil spring in one embodiment, can bias the valve structure (e.g., 1204) toward the valve seat (e.g., 1202) to a closed position. This can enhance safe operation of the associated fluid control assembly (e.g., 1020). The biasing member (e.g., 1130) can be configured to exert a biasing force of a magnitude that does not damage the valve seat (e.g., 1202). For example, if a coil spring is used as the biasing member, a spring constant can be selected that achieves the desired result.

The configuration of an orifice plate (e.g., 1095) of the multi-function valve (e.g., 1120) can result in "user friendly" operation. For example, the orifice plate (e.g., 1095) can define a plurality of orifices that can be arranged so that the multi-function valve (e.g., 1120) can be opened with a relatively small angular rotation of the knob (e.g., 1122) of the multi-function valve (e.g., 1120).

The fluid control assembly (e.g., 1010) can be relatively compact to reduce the form factor of the fluid control assembly. For example, a fluid inlet port (e.g., 1032) of the fluid control assembly (e.g., 1010) can be configured such that a fluid inlet passage (e.g., 1028) defined by the fluid inlet port (e.g., 1032) extends continuously downstream of an end surface (e.g., 1034) of the fluid inlet port (e.g., 1032). In one embodiment, the fluid inlet passage (e.g., 1028) can extend continuously and linearly away from the end surface (e.g., 1034) of the fluid inlet port (e.g., 1032). Also, in this regard, the fluid control assembly (e.g., 1010) can include an auxiliary valve (e.g., 1091) that includes a portion that can be made integrally with a housing (e.g., 1081) of a pressure regulator (e.g., 1016) of the fluid control assembly (e.g., 1010).

While various embodiments of a flow path insert and a fluid control assembly have been illustrated by the foregoing description and have been described in considerable detail, it is not intended to restrict or in any way limit the scope of the appended claims to such detail. Additional modifications will be readily apparent to those skilled in the art.

What is claimed is:

1. A fluid control assembly comprising:
   a body, the body defining a fluid inlet passage, a fluid outlet passage, and a regulator inlet orifice;
   a pressure regulator coupled with the body and at least partially defining a regulator chamber, the regulator chamber being in at least intermittent fluid communication with the regulator inlet orifice;
   a flow path insert positioned within, and engaged with, the body, the flow path insert comprising:
      an ignition-resistant material;
      an upstream portion comprising an upstream end surface;
      a downstream portion integral with the upstream portion, the downstream portion comprising a downstream end surface and a downstream peripheral surface, wherein
         the upstream portion and the downstream portion cooperate to define an inlet passage and an outlet passage in fluid communication with the inlet passage, the outlet passage extending through the downstream peripheral surface;
         the inlet passage defining a first axis, the outlet passage defining a second axis transverse to the first axis, wherein the inlet passage defined by the flow path insert is in selective fluid communication with the fluid inlet passage;
         the upstream portion defining a first cavity and further comprises a recessed surface longitudinally spaced from the upstream end surface;
         the inlet passage extending through the recessed surface and is in fluid communication with the first cavity;

the outlet passage is longitudinally spaced from the recessed surface; and the outlet passage comprising a first discharge orifice, a second discharge orifice, and a second cavity; and a multi-function valve coupled with the body, the multi-function valve comprising:

a knob, the knob being rotatable relative to the body;

an orifice plate coupled with the knob, the orifice plate defining a plurality of circumferentially spaced orifices;

a valve seat;

a valve structure translatable relative to the valve seat between a closed position and an open position; and a biasing member, the biasing member biasing the valve structure toward the closed position; wherein the valve structure is translatable between the closed position and the open position in response to rotation of the knob, such that the fluid inlet passage is in selective fluid communication with the regulator inlet orifice; and the orifice plate is rotatable with the knob, such that each of the orifices is in selective fluid communication with each of the regulator chamber and the fluid outlet passage, in response to rotation of the knob.

2. The fluid control assembly of claim 1, further comprising:

means for translating the valve structure in response to rotation of the knob.

3. The fluid control assembly of claim 1, wherein:

the multi-function valve further comprises a valve stem;

the valve stem contacts the valve structure and is translatable relative to the body, such that the valve stem operably, selectively forces the valve structure away from the valve seat against a biasing force of the biasing member, in response to rotation of the knob.

4. The fluid control assembly of claim 3, further comprising:

a driver; wherein the driver is rotatably coupled with the knob, threadedly engaged with the body, and coupled with the valve stem, such that the driver is rotatable and translatable, and the valve stem is translatable, in response to rotation of the knob.

5. The fluid control assembly of claim 4, wherein:

the multi-function valve further comprises a coupling member and a splined member;

the coupling member comprises a proximal end secured to the knob and a distal end integral with the orifice plate such that the coupling member is rotatable with the knob and the orifice plate; and the splined member is coupled with the orifice plate for rotation with the orifice plate and is splined to the driver, the driver being rotatable with the splined member and the orifice plate.

6. The fluid control assembly of claim 4, wherein:

the body comprises a fluid inlet port, the fluid inlet port defining at least a portion of the fluid inlet passage, the fluid inlet port comprising an end surface; and the fluid inlet passage extends continuously downstream away from the end surface of the fluid inlet port.

7. The fluid control assembly of claim 6, wherein:

the fluid inlet passage extends linearly away from the end surface of the fluid inlet port, in a downstream direction.

8. The fluid control assembly of claim 6, wherein:

the body further defines a first cavity in fluid communication with the fluid inlet passage;

the biasing member and at least a portion of the valve structure are positioned within the first cavity; and the first cavity extends continuously downstream, away from the fluid inlet passage.

9. The fluid control assembly of claim 1, wherein:

the orifice plate comprises an upstream surface;

the upstream surface defines a plurality of recessed areas, the recessed areas being equally spaced circumferentially from one another;

the orifice plate defines a plurality of orifices, each of the orifices being positioned in a respective one of the recessed areas; and a total number of the orifices is one less than a total number of the recessed areas, one of the recessed areas being devoid of one of the orifices.

10. The fluid control assembly of claim 9, wherein:

the plurality of recessed areas comprises twelve of the recessed areas, the recessed areas being spaced thirty degrees from one another; and the plurality of orifices comprises eleven of the orifices.

11. The fluid control assembly of claim 1, further comprising:

an auxiliary valve defining an interior chamber in selective fluid communication with the regulator chamber; wherein the pressure regulator comprises a housing threadedly engaged with the body; and the auxiliary valve comprises a first portion integrally formed with the housing as a unitary structure.

12. The fluid control assembly of claim 1, wherein:

the flow path insert defines a cavity; and the valve seat is positioned within the cavity.

13. The fluid control assembly of claim 1, wherein:

the flow path insert is upstream of the pressure regulator.

14. The fluid control assembly of claim 1, wherein:

the pressure regulator comprises a regulator seat;

the body comprises a regulator seat interface portion, the regulator seat interface portion comprising a plateau;

the regulator seat interface portion of the body comprises a machined portion of the body; and the plateau of the regulator seat interface portion is positioned in a confronting relationship with the regulator seat.

15. The fluid control assembly of claim 14, wherein:

the regulator seat interface portion of the body has a frustoconical shape; and the plateau of the regulator seat interface portion is planar.

16. The fluid control assembly of claim 1, wherein:

the first discharge orifice is in fluid communication with the inlet passage;

the second cavity is in fluid communication with each of the first discharge orifice and the second discharge orifice; and the second discharge orifice extends through the downstream peripheral surface.

17. The fluid control assembly of claim 16, wherein:

the inlet passage extends through the downstream end surface.

18. The fluid control assembly of claim 17, wherein:

the second cavity extends through the downstream end surface and is configured to receive a filter of a fluid control assembly.

19. The fluid control assembly of claim 1, wherein:
the upstream portion comprises an upstream peripheral surface.

20. The fluid control assembly of claim 19, wherein:
the upstream peripheral surface comprises a cylindrical surface devoid of threads.

21. The fluid control assembly of claim 19, wherein:
the upstream portion further comprises an upstream ring, the upstream ring comprising the upstream peripheral surface;
the downstream portion further comprises a downstream ring and an annular flange; and
each of the upstream ring, the downstream ring, and the annular flange engage the body, and the downstream ring, the downstream peripheral surface, and the annular flange cooperate with the body to define the annular passage.

22. The fluid control assembly of claim 19, wherein: the upstream portion and the downstream portion cooperate to define an annular channel, the annular channel being configured to receive an annular seal of a fluid control assembly.

* * * * *